United States Patent
Ishioka et al.

(10) Patent No.: US 12,287,493 B2
(45) Date of Patent: Apr. 29, 2025

(54) LENS SYSTEM AND IMAGE OBSERVATION APPARATUS

(71) Applicant: Sony Interactive Entertainment Inc., Tokyo (JP)

(72) Inventors: Manabu Ishioka, Tokyo (JP); Yasutoshi Katsuda, Kanagawa (JP); Shotaro Tada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/534,990

(22) Filed: Dec. 11, 2023

(65) Prior Publication Data

US 2024/0126053 A1    Apr. 18, 2024

Related U.S. Application Data

(63) Continuation of application No. 17/269,435, filed as application No. PCT/JP2019/033760 on Aug. 28, 2019, now Pat. No. 11,874,448.

(30) Foreign Application Priority Data

Aug. 28, 2018 (JP) .................................. 2018-159721
Oct. 18, 2018 (JP) .................................. 2018-196914

(51) Int. Cl.
*G02B 3/08* (2006.01)
*G02B 3/04* (2006.01)
(Continued)

(52) U.S. Cl.
CPC ................. *G02B 3/08* (2013.01); *G02B 3/04* (2013.01); *G02B 5/04* (2013.01); *G02B 13/18* (2013.01);
(Continued)

(58) Field of Classification Search
CPC . G02B 13/18; G02B 3/04; G02B 3/08; G02B 5/04; G02B 25/00; G02B 27/0172;
(Continued)

(56) References Cited

U.S. PATENT DOCUMENTS 3,028,793 A    4/1962 Bousky
3,580,655 A    5/1971 Leith
(Continued)

FOREIGN PATENT DOCUMENTS

CN    105045015 A    11/2015
CN    107250896 A    10/2017
(Continued)

OTHER PUBLICATIONS

Office Action for related U.S. Appl. No. 17/269,441, 50 pages, dated Jan. 18, 2024.
(Continued)

*Primary Examiner* — Darryl J Collins
*Assistant Examiner* — Matthew Y Lee
(74) *Attorney, Agent, or Firm* — Kilpatrick Townsend & Stockton LLP

(57) ABSTRACT

A lens system provides to a user, a high-definition image in which generation of concentric circles is reduced. The lens system has one or more Fresnel lenses. A lens surface of each of the Fresnel lenses has a plurality of grooves that is concentrically formed. Both a pitch which is the distance between two adjacent grooves and the depth of each of the plurality of grooves vary with the distance from an optical axis that passes through the center of the lens system.

20 Claims, 33 Drawing Sheets

(51) Int. Cl.
  *G02B 5/04* (2006.01)
  *G02B 13/18* (2006.01)
  *G02B 25/00* (2006.01)
  *G02B 27/01* (2006.01)
  *G02B 27/02* (2006.01)
(52) U.S. Cl.
  CPC ......... *G02B 25/00* (2013.01); *G02B 27/0172* (2013.01); *G02B 27/02* (2013.01)
(58) Field of Classification Search
  CPC .............................. G02B 27/02; G02B 25/002; G02B 2027/011; G02B 2027/0178; G02B 25/001
  See application file for complete search history.

(56) References Cited

U.S. PATENT DOCUMENTS

| | | | |
|---|---|---|---|
| 3,894,787 | A | 7/1975 | Leith |
| 5,013,133 | A | 5/1991 | Buralli |
| 5,790,322 | A | 8/1998 | Kameda |
| 9,104,019 | B2 | 8/2015 | Okano |
| 9,323,040 | B2 | 4/2016 | Ishizuka |
| 9,759,889 | B1 | 9/2017 | Tang |
| 10,459,215 | B2 | 10/2019 | Iba |
| 10,502,950 | B2 | 12/2019 | Kikuchi |
| 10,641,931 | B2 | 5/2020 | Tada |
| 10,921,583 | B2 | 2/2021 | Matsumoto |
| 2003/0058546 | A1 | 3/2003 | Sato |
| 2006/0256452 | A1 | 11/2006 | Lung |
| 2010/0026920 | A1* | 2/2010 | Kim ............... H04N 13/305 349/33 |
| 2010/0061105 | A1 | 3/2010 | Shyu |
| 2013/0176628 | A1 | 7/2013 | Batchko |
| 2013/0209677 | A1* | 8/2013 | Dellea .............. B29D 11/00269 427/164 |
| 2014/0218806 | A1 | 8/2014 | Ishizuka |
| 2014/0347624 | A1* | 11/2014 | Ando .................. G02C 7/06 351/159.73 |
| 2014/0347739 | A1 | 11/2014 | Okano |
| 2015/0301317 | A1* | 10/2015 | Watanabe ......... G02B 27/4211 359/356 |
| 2016/0316180 | A1 | 10/2016 | Han |
| 2017/0336539 | A1 | 11/2017 | Perreault |
| 2018/0074318 | A1 | 3/2018 | Wheelwright |
| 2018/0074325 | A1* | 3/2018 | Wheelwright ..... G02B 27/0176 |
| 2018/0143400 | A1 | 5/2018 | Bone |
| 2018/0275398 | A1 | 9/2018 | Kikuchi |
| 2018/0307036 | A1 | 10/2018 | Iba |
| 2018/0372925 | A1 | 12/2018 | Tada |
| 2019/0049752 | A1* | 2/2019 | Van Heugten ......... G02C 7/083 |
| 2019/0072763 | A1 | 3/2019 | Matsumoto |
| 2021/0011291 | A1 | 1/2021 | Chen |
| 2021/0199967 | A1 | 7/2021 | Takagi |
| 2021/0302627 | A1 | 9/2021 | Suzuki |
| 2023/0125258 | A1 | 4/2023 | Connor |

FOREIGN PATENT DOCUMENTS

| | | | |
|---|---|---|---|
| DE | 112019003514 | T5 | 4/2021 |
| JP | 5346539 | A | 12/1993 |
| JP | 2006330432 | A | 12/2006 |
| JP | 2007011216 | A | 1/2007 |
| JP | 2013045020 | A | 3/2013 |
| JP | 2014228716 | A | 12/2014 |
| JP | 2015203850 | A | 11/2015 |
| JP | 2017211474 | A | 11/2017 |
| JP | 2017211475 | A | 11/2017 |
| JP | 2018106167 | A | 7/2018 |
| JP | 2020013106 | A | 1/2020 |
| KR | 20050023970 | A | 3/2005 |
| WO | 2017138480 | A1 | 8/2017 |
| WO | 2017161437 | A1 | 9/2017 |
| WO | 2018008249 | A1 | 1/2018 |
| WO | 2018117025 | A1 | 6/2018 |
| WO | 2019163415 | A | 8/2019 |
| WO | 2020021916 | A1 | 1/2020 |

OTHER PUBLICATIONS

Frank W. Cousins: "The Optics of Projection Television" The Radio Constructor, pp. 1-5, Oct. 1, 1953.
Rinia et al. "The Manufacture of Correction Plates for Schmidt Optical Systems" Philips Technical Review vol. 9, No. 12, pp. 349-356, Jan. 1947/1948.
Alphen et al. "Projection-Television Receiver, I The Optical System for the Projection" Philips Technical Review vol. 10, No. 3, pp. 69-78, Sep. 1, 1948.
International Search Report for corresponding PCT Application No. PCT/JP2019/033759, 4 pages, dated Dec. 3, 2019.
International Search Report for related PCT Application No. PCT/JP2019/033760, 4 pages, dated Dec. 3, 2019.
International Preliminary Report on Patentability and Written Opinion for related PCT Application No. PCT/JP2019/033759, 9 pages, dated dated Mar. 11, 2021.
International Preliminary Report on Patentability and Written Opinion for corresponding PCT Application No. PCT/JP2019/033760, 9 pages, dated Mar. 11, 2021.
Office Action for related JP Application No. 2020-539554, 5 pages, dated Nov. 9, 2021.
Decision to Grant a Patent for related JP Application No. 2020-539554, 3 pages, dated Jan. 13, 2022.
Extended European Search Report for corresponding EP Application No. 19853868.8, 9 pages, dated Apr. 22, 2022.
Wikipedia, "Image Circle", URL:https://en.wikipedia.org/wiki/Image_circle, 2 pages dated Oct. 27, 2018.
Office Action for corresponding CN application No. 201980057197.3, 18 pages, dated Sep. 28, 2022.
Notice of Reasons for Refusal for corresponding application No. 2020-539555, 8 pages, dated Feb. 20, 2023.
Office Action for related U.S. Appl. No. 17/269,441, 17 pages, dated Aug. 1, 2024.
Prinout of Eijiro WEB Pro English Japanese Translations of effective radius and effective diameter, https://eow.alc.co.jp/u search?q=%e6%9c%89%e5%8a%b9%e5%be%84 & https://eow.alc.co.jp/search?q=%e6%9c%89%e5%8a%b9%e5%8d%8a%e5%be%84, 14 pages, Jul. 8, 2024.
Printout of Eijiro Web Pro English Japanese Translations of effective radius and effective diameter, https://eow.alc.co.jp/search?q=%e6%9c%89%e5%8a%b9%e5%be%84 & https://eow.alc.co.jp/search?q=%e6%9c%89%e5%8a%b9%e5%8d%8a%e5%be%84, 14 pages, Jul. 8, 2024 (recited to correct typo in citation of IDS filed Oct. 7, 2024).

* cited by examiner (a)

(b)

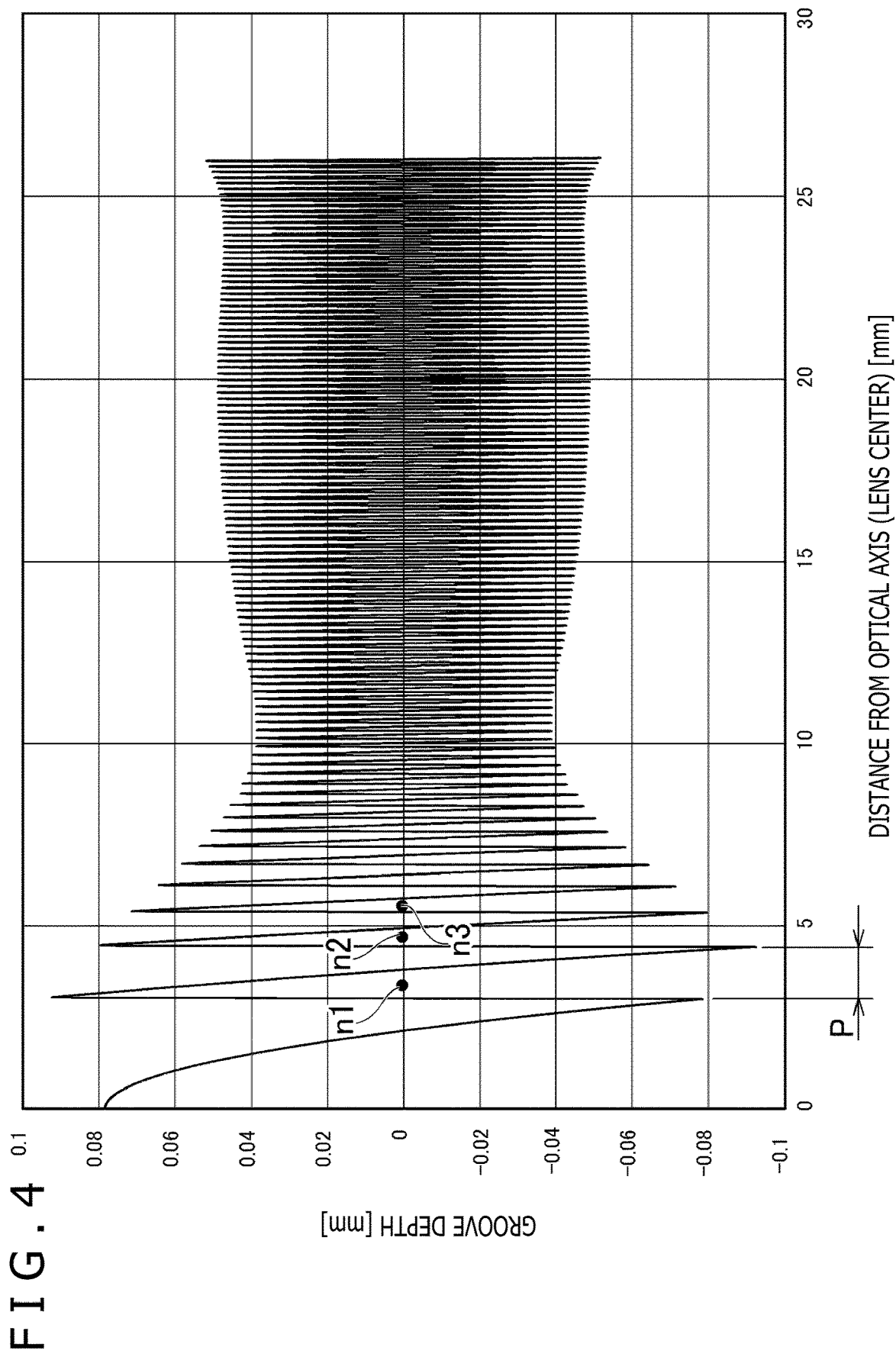
F I G . 4

SPATIAL FREQUENCY (cycle/deg)

| A1 | 271.568494459294000000 |
| A2 | -389.942040333408000000 |
| A3 | 413.705099777319000000 |
| A4 | -200.769045408524000000 |
| A5 | 52.162569854946900000 |
| A6 | -7.860625982733840000 |
| A7 | 0.691624844400394000 |
| A8 | -0.033056071200590500 |
| A9 | 0.000664264850893215 |

| LENS SYSTEM | POINT | SIGHT LINE ANGLE (deg) | DISTANCE FROM OPTICAL AXIS (LENS CENTER) (mm) | GROOVE PITCH (mm) |
|---|---|---|---|---|
| SH | H1 | 0.0 | 0.0 | 2.7 |
| SH | H2 | 5.1 | 2.7 | 1.1 |
| SH | H3 | 7.3 | 4.7 | 0.7 |
| SG | G1 | 13.5 | 7.2 | 0.9 |
| SG | G2 | 23.2 | 12.9 | 0.6 |

| LENS SYSTEM | POINT | SIGHT LINE ANGLE (deg) | DISTANCE FROM OPTICAL AXIS (LENS CENTER) (mm) | GROOVE PITCH (mm) |
|---|---|---|---|---|
| SA | A1 | 0 | 0.0 | 3.3 |
| SA | A2 | 6.4 | 3.3 | 1.4 |
| SA | A3 | 9.1 | 4.6 | 1.1 |
| SA | A4 | 11.1 | 5.7 | 0.9 |
| SA | A5 | 12.8 | 6.6 | 0.8 |
| SB | B1 | 20.4 | 9.7 | 0.6 |
| SC | C1 | 24.0 | 10.5 | 0.5 |
| SD | D1 | 29.5 | 12.6 | 0.3 |
| SE | E1 | 27.6 | 16.3 | 0.2 |
| SE | E2 | 42.1 | 26.1 | 0.2 |

LENS SYSTEM AND IMAGE OBSERVATION APPARATUS

CROSS REFERENCE TO RELATED APPLICATIONS

This is a continuation application of U.S. patent application Ser. No. 17/269,435, accorded a filing date of Feb. 18, 2021 (allowed); which is a national phase application of International Application No. PCT/JP2019/033760, filed Aug. 28, 2019; which claims priority to Japanese Application No. JP 2018-159721, filed Aug. 28, 2018 and Japanese Application No. JP 2018-196914, filed Oct. 18, 2018, the entire disclosures of which are hereby incorporated by reference.

TECHNICAL FIELD

The present disclosure relates to a lens system having a Fresnel lens and to an image observation apparatus.

BACKGROUND ART

FIG. 1 is a schematic cross-sectional view of a Fresnel lens structure. As depicted in FIG. 1, the Fresnel lens has a plurality of grooves R that is formed to be concentrically arranged. Each projection (prism 3) that has an inclined surface 3a and a vertical surface 3b and has a ring-like shape in plan view is formed between two adjacent grooves R. The inclined surfaces 3a are obtained by dividing a spherical or aspherical lens surface into a plurality of ring-like regions. PTL 1 discloses an example of a conventional Fresnel lens.

CITATION LIST

Patent Literature

[PTL 1] PCT Patent Publication No. WO 2017/138480

SUMMARY

Technical Problem

As depicted in FIG. 1, in the Fresnel lens, the inclined surfaces 3a and the vertical surfaces 3b are alternately repeated in the radial direction of the lens. The inclined surfaces 3a are effective surfaces that cause refraction of light to obtain a formed image, while the vertical surfaces 3b are non-effective surfaces that do not make any contribution to image forming. For this reason, even in a case where an image the luminance of which is uniform over the whole area of a display surface is displayed on the display surface, when the image is observed through the Fresnel lens, a gradation change (contrast) may be generated in the radial direction of the lens. Further, in some cases, an observer recognizes the gradation change as a circular pattern centered on the optical axis (see FIG. 26). In the present description, such a pattern which is caused by the shape of a Fresnel lens is referred to as "concentric circles" (in FIG. 26, broken lines T are added at the generation positions of the concentric circles to emphasize concentric circles).

One object of the present disclosure is to propose a lens system capable of providing, to a user, an image in which generation of concentric circles is reduced and which has high resolution (definition), and an image observation apparatus.

Solution to Problem

A lens system proposed by the present disclosure includes one or more Fresnel lenses. A lens surface of each of the one or more Fresnel lenses has a plurality of grooves arranged in a radial direction of the corresponding Fresnel lens. Both a pitch which is a distance between two adjacent grooves and a depth of each of the grooves vary with a distance from an optical axis that passes through the center of the lens system. An image observation apparatus proposed by the present disclosure includes the lens system.

BRIEF DESCRIPTION OF DRAWINGS

FIG. 4 is a graph depicting an example of variations of a groove depth and a groove pitch in a Fresnel lens.

DESCRIPTION OF EMBODIMENTS

Hereinafter, one embodiment of a lens system and an image observation apparatus proposed by the present disclosure will be explained.

The lens system proposed by the present disclosure has one or more Fresnel lenses. For example, the lens system is used as an ocular optical system which is installed in an image observation apparatus for a user to view a still picture or a video displayed on a display element.

Image Observation Apparatus

Figure 2:
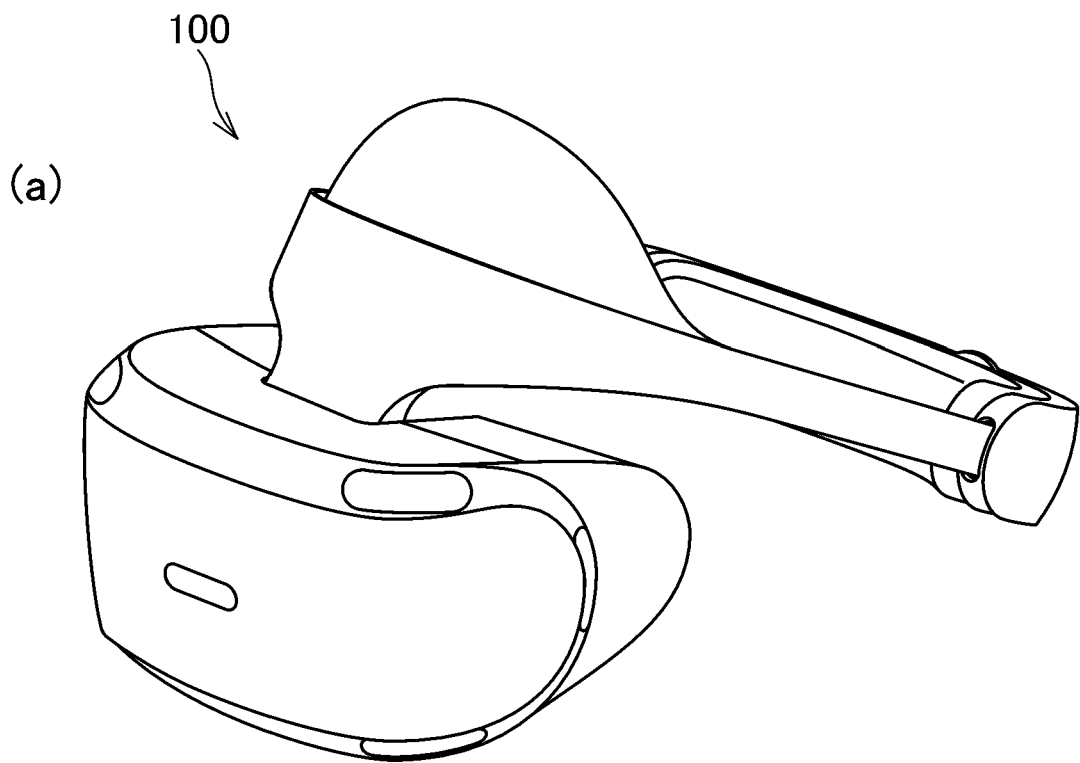
FIG. 2 depicts diagrams of a head mounted display as an example of an image observation apparatus to which a lens system according to the present disclosure is applied.
Figure 2:
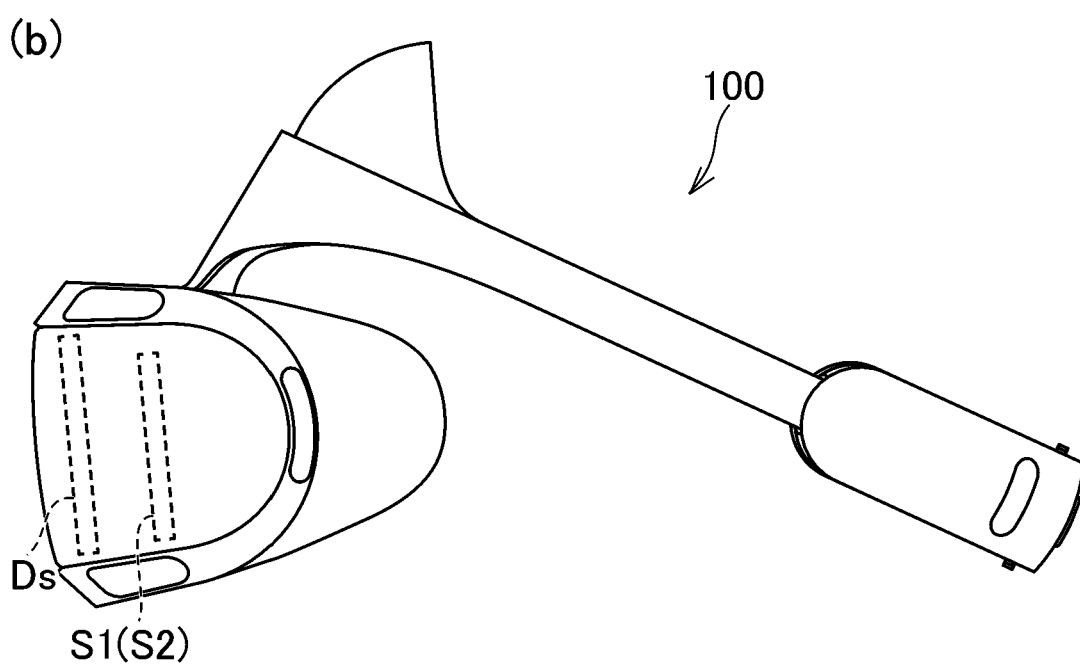

For example, the image observation apparatus is a head mounted display 100 (see FIG. 2). The head mounted display 100 includes a display surface Ds which is placed in front of eyes of a user (observer), and lens systems S1 or lens systems S2 that will be explained later. The display surface Ds is a liquid crystal display device, an organic EL (electroluminescence) display device, or a micro OLED display device, for example. In a case where the lens systems S1 (S2) are installed in the head mounted display 100, the two lens systems S1 (S2) are disposed side by side. It is to be noted that the image observation apparatus in which the lens system S1 (S2) is installed is not limited to the head mounted display 100. The image observation apparatus may be an electronic viewfinder of a camera, for example. In this case, it is sufficient that one lens system S1 (S2) is installed in the image observation apparatus.

First Embodiment

Figure 3:
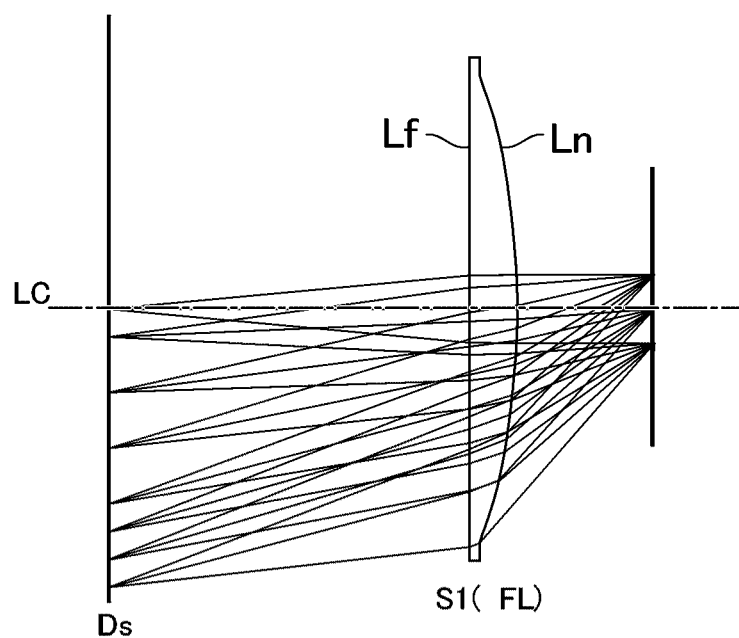
FIG. 3 is a diagram depicting a configuration example of a lens system which is proposed by the present disclosure and includes one Fresnel lens.

FIG. 3 is a diagram depicting a configuration of the lens system S1 according to a first embodiment. The lens system S1 includes one Fresnel lens FL. A lens system may include two Fresnel lenses, as explained later. The Fresnel lens FL has a lens surface Lf directed to the display surface Ds side. The lens surface Lf has a Fresnel structure. The Fresnel lens FL has a lens surface Ln opposite to the lens surface Lf. The lens surface Ln has a convex aspherical shape, for example.

The structure of the lens system S1 is not limited to the example depicted in FIG. 3. For example, the Fresnel lens FL does not need to have the lens surface Ln having an aspherical shape. The lens surface Lf having a Fresnel structure may be directed to a side opposite to the display surface Ds.

Figure 1:
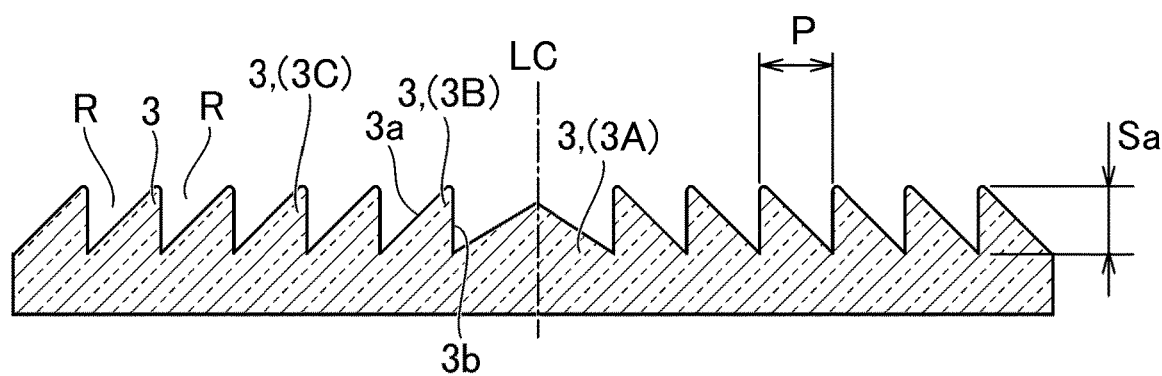
FIG. 1 is a diagram schematically depicting a cross section of a Fresnel lens.

As in the Fresnel lens depicted in FIG. 1, the lens surface Lf of the Fresnel lens FL has a plurality of grooves (reference sign R in FIG. 1) that is concentrically arranged. Each projection (prism 3) is formed between the adjacent grooves. FIG. 4 is a graph depicting an example of the relation between a distance from an optical axis LC and a groove depth. The optical axis LC passes through the center of the Fresnel lens FL.

In the lens surface Lf of the Fresnel lens FL, both a pitch which is a distance between adjacent two grooves, that is, the width of a prism 3 (reference sign P in FIG. 1), and a groove depth Sa, that is, the height of a prism 3 (reference sign Sa in FIG. 1), vary with the distance from the optical axis LC (lens center) (hereinafter, the pitch is referred to as a "groove pitch," and the depth of a groove is referred to as a "groove depth"). It is sufficient that a range where the groove pitch gradually varies with the distance from the optical axis LC at least partially overlaps with a range where the groove depth gradually varies with the distance from the optical axis LC. That is, the range where the groove pitch gradually varies does not need to completely identical to the range where the groove depth gradually varies. For example, while the groove pitch gradually varies in a range where the distance from the optical axis LC is 3 to 10 mm, the groove depth may gradually vary in a range where the distance from the optical axis LC is 5 to 25 mm. In this case, both the groove pitch and the groove depth gradually vary in a range where the distance from the optical axis LC is 5 to 10 mm.

It is to be noted that the expression that "the groove depth gradually varies with the distance from the lens center" means that a decrease of the groove depth continues over a plurality of grooves continuously arranged in the radial direction of the Fresnel lens, and that an increase of the groove depth continues over a plurality of grooves continuously arranged in the radial direction of the Fresnel lens. Also, the expression that "the groove pitch gradually varies with the distance from the lens center" means that a decrease of the groove pitch continues over a plurality of grooves continuously arranged in the radial direction of the Fresnel lens, and that an increase of the groove pitch continues over a plurality of grooves continuously arranged in the radial direction of the Fresnel lens. Further, the term "groove pitch" refers to a distance between two adjacent grooves, and more specifically, refers to a distance P (see FIG. 4) between the deepest position of one groove and the deepest position of a groove adjacent to the one groove. The term "groove depth" refers to a vertical distance between the apex of a prism adjoining a groove and the deepest position of the groove.

When an image the luminance of which is uniform over the whole area of the display surface Ds is displayed to be observed through a conventional Fresnel lens, a gradation change (contrast) may be generated in a direction away from the optical axis. An observer may recognize this gradation change as a circular pattern (concentric circles) centered on the position of the optical axis. When the groove pitch is reduced, light having passed through inclined surfaces (reference sign 3a in FIG. 1) disposed on both sides of a vertical surface (reference sign 3b in FIG. 1) of a prism arrives at a region that is darkened due to the vertical surface. Thus, the gradation change is reduced. That is, when the groove pitch is reduced, generation of concentric circles is suppressed. However, in an actual Fresnel lens, when the groove pitch is smaller, the angle of each inclined surface is more likely to be largely deviated from a normal value (design value), so that it is difficult to obtain a properly formed image. That is, when the groove pitch is set to be smaller, a low-resolution (definition) image is more likely to be formed.

It is to be noted that, in the present description, the vertical surfaces 3b are substantially vertical with respect to the horizontal plane (a plane orthogonal to the optical axis). The angle formed between the vertical surfaces 3b and the horizontal plane may be slightly deviated from 90 degrees.

In a conventional Fresnel lens, the groove pitch is uniform over the entirety of the lens, or the groove depths are uniform over the entirety of the lens. Therefore, it is difficult to set the groove pitch to a value that is suitable for reducing concentric circles and forming a high-resolution image. For example, in a Fresnel lens in which a groove pitch is uniform over the entirety of the lens, when the groove pitch is reduced, the resolution (definition) of an image formed through the Fresnel lens is deteriorated. In addition, a Fresnel lens is formed by arranging, on a horizontal surface, a plurality of inclined surfaces that is obtained by dividing a spherical or aspherical lens surface into multiple regions. Therefore, in a Fresnel lens in which the value of the groove depth is fixed over the entirety of the lens, the groove pitch is defined according to the distance from the optical axis LC. The groove pitch thus defined is not necessarily set to a preferable value from the viewpoint of reduction of concentric circles and formation of a high-resolution image.

In contrast, according to the Fresnel lens FL proposed by the present disclosure, both a groove pitch and a groove depth vary with the distance from the optical axis LC (lens center). Consequently, it is easy to reduce concentric circles and form a high-resolution (definition) image.

In one example of the Fresnel lens FL, there is a range where the groove depth gradually increases with an increase of the distance from the optical axis LC. In at least a part of a range regarding the distance from the optical axis LC, the groove pitch gradually decreases with an increase of the distance from the optical axis LC. For example, in the whole range of the Fresnel lens FL, the groove pitch gradually decreases with an increase of the distance from the optical axis LC. For example, the decrease rate of the groove pitch is high in the range of 0 mm to a prescribed distance (e.g., 5 mm) and is lower in a range of the prescribed distance or more, than in the range of 0 mm to the prescribed distance (e.g., 5 mm). Alternatively, the groove pitch may be fixed in the range of the prescribed distance or more. On the other hand, there may be a range where the groove depth gradually decreases and a range where the groove depth gradually increases. For example, the groove depth may gradually decrease in the range of 0 mm to the prescribed distance and may gradually increase in the range of the prescribed distance or more.

It is to be noted that, in a conventional Fresnel lens, a lens surface having a Fresnel structure is formed in such a way that the deepest points of grooves are arranged on a horizontal plane. In contrast, the lens surface Lf of the Fresnel lens FL may be formed in such a way that middle points (n1, n2, n3, etc., in FIG. 4), in the height direction (groove depth direction), of projections (prisms) each formed between adjacent grooves are arranged on a horizontal plane, as depicted in FIG. 4. In this case, the projections (prisms) may be arranged along an aspherical surface (e.g., a concave surface), instead of being arranged on a horizontal plane.

Figure 5:
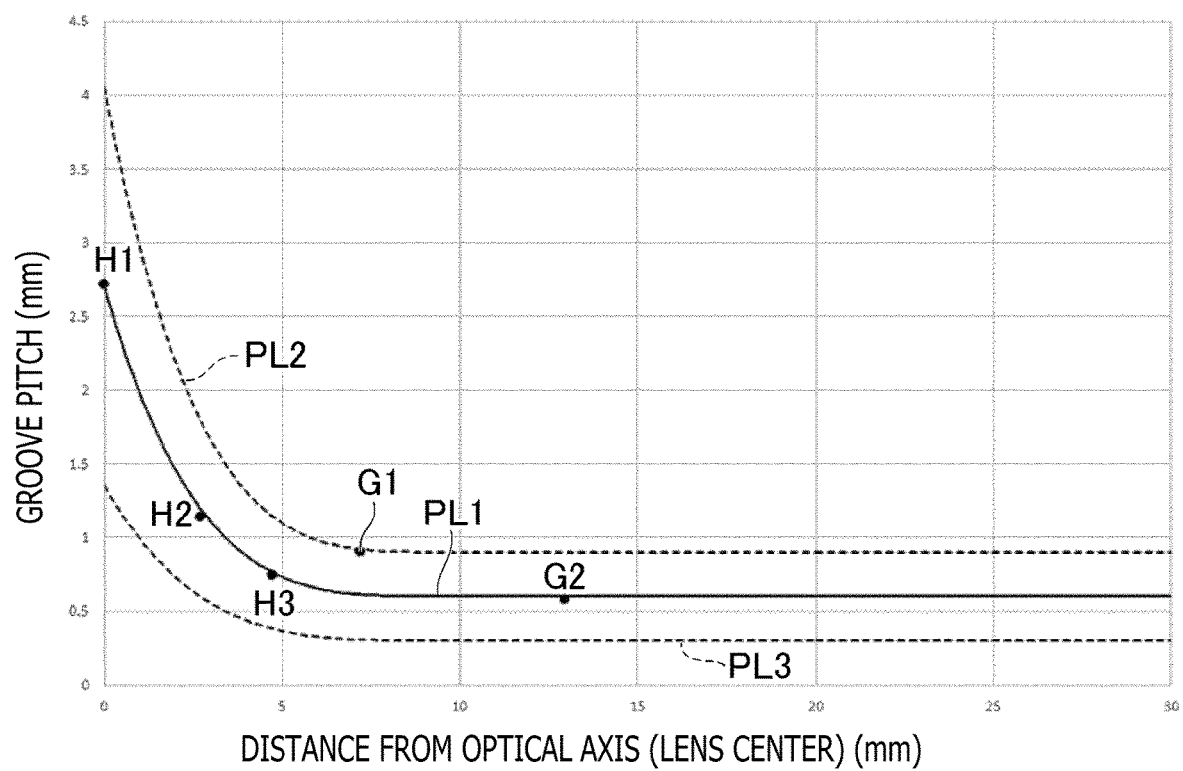
FIG. 5 is a graph depicting a condition of a groove pitch with respect to a distance from an optical axis in the configuration of the lens system depicted in FIG. 3.

FIG. 5 is a graph for depicting the condition of a desired groove pitch. In FIG. 5, a solid line PL1 indicates the following formula (1).

$$0 \text{ mm} \leq X \leq 10 \text{ mm}: P = 0.00021(X-10)^4 + 0.6$$

$$10 \text{ mm} < X: P = 0.6 \text{ mm} \qquad \text{Formula (1):}$$

In the formula (1), "P" represents a groove pitch (mm), and "X" represents a distance (mm) from the optical axis LC (lens center). In addition, in the graph in FIG. 5, the groove pitch at a distance of 0 mm from the optical axis LC means the distance from the optical axis LC to the innermost groove. In other words, the groove pitch at a distance of 0 mm from the optical axis LC is the radius of the prism 3 (prism 3A in FIG. 1) located on the lens center. These definitions also apply to the following explanation.

As indicated by broken lines PL2 and PL3 in FIG. 5, it is desirable that, when 0 mm≤X≤10 mm, X and P satisfy the following conditions.

$$\text{Broken line } PL2: P \leq (0.00021(X-10)^4 + 0.6) \times 1.5$$

$$\text{Broken line } PL3: P \geq (0.00021(X-10)^4 + 0.6) \times 0.5 \qquad \text{Condition (1-1):}$$

When the groove pitch falls within the range of condition (1-1), it is easy to reduce concentric circles, compared to a case where the groove pitch is greater than the range of condition (1-1). In addition, it is easy to obtain a high-resolution (definition) image, compared to a case where the groove pitch is less than the range of condition (1-1).

Also, it is desirable that, when 10 mm<X, the groove pitch satisfy the following conditions.

$$\text{Line } PL2: P \leq 0.9$$

$$\text{Line } PL3: 0.3 \leq P \qquad \text{Condition (1-2):}$$

When the groove pitch satisfies the range of condition (1-2), it is easy to reduce concentric circles within the range of 10 mm<X, compared to a case where the groove pitch is greater than the range of condition (1-2). When the groove pitch satisfies the range of condition (1-2), it is easy to obtain a high-resolution (definition) image within the range of 10 mm<X, compared to a case where the groove pitch is less than the range of condition (1-2).

It is to be noted that, in the lens surface Lf of the Fresnel lens FL, inclined surfaces that are obtained by dividing a spherical or aspherical lens surface into a plurality of regions at a groove pitch are arranged on a horizontal plane. Therefore, if the surface shape of a lens surface that is the basis of the lens surface Lf of the Fresnel lens FL and the groove pitch are defined, the groove depth is automatically defined. The surface shape of a lens surface that is the basis of the lens surface Lf of the Fresnel lens FL may be designed according to optical performance that is desired for an image observation apparatus employing the lens system S1.

Further, when 0 mm≤X≤10 mm, the distance X from the optical axis LC and the groove pitch P may satisfy the following conditions.

$$P \leq (0.00021(X-10)^4 + 0.6) \times 1.5$$

$$P \geq (0.00021(X-10)^4 + 0.6) \times 0.9 \quad \text{Condition (2-1):}$$

When the groove pitch satisfies the range of condition (2-1), it is easy to obtain a high-resolution (definition) image, compared to a case where the groove pitch is less than the range of condition (2-1).

In addition, it is desirable that, when 10 mm<X, the groove pitch P satisfy the following condition.

$$0.54 \leq P \leq 0.90 \quad \text{Condition (2-2):}$$

When the groove pitch satisfies the range of condition (2-2), it is easy to obtain a high-resolution (definition) image within the range of 10 mm<X, compared to a case where the groove pitch is less than the range of condition (2-2).

Moreover, when 0 mm≤X≤10 mm, the distance X from the optical axis LC and the groove pitch P may satisfy the following conditions.

$$P \leq (0.00021(X-10)^4 + 0.6) \times 1.1$$

$$P \geq (0.00021(X-10)^4 + 0.6) \times 0.5 \quad \text{Condition (3-1):}$$

When the groove pitch satisfies the range of condition (3-1), it becomes easier to reduce concentric circles.

In addition, it is desirable that, when 10 mm<X, the groove pitch P satisfy the following condition.

$$0.30 \leq P \leq 0.66 \quad \text{Condition (3-2):}$$

When the groove pitch P satisfies the range of condition (3-2), it becomes easier to reduce concentric circles in the range of 10 mm<X.

Further, it is desirable that the groove pitch P satisfy the following conditions.

In a position at a distance of 0 mm from the optical axis LC: $1.35 \leq P \leq 4.05$ mm In a position at a distance of 5 mm from the optical axis LC: $0.37 \leq P \leq 1.10$ mm In a position at a distance of 10 mm from the optical axis LC: $0.30 \leq P \leq 0.90$ mm  Condition (4)

When the groove pitch P falls within the range of condition (4), it is easy to reduce concentric circles, compared to a case where the groove pitch P is greater than the range of condition (4). In addition, it is easy to obtain a high-resolution (definition) image, compared to a case where the groove pitch P is less than the range of condition (4).

Further, the groove pitch P may satisfy the following conditions.

In a position at a distance of 0 mm from the optical axis LC: $2.43 \leq P \leq 4.05$ mm In a position at a distance of 5 mm from the optical axis LC: $0.66:5 \leq P \leq 1.10$ mm In a position at a distance of 10 mm from the optical axis LC: $0.54 \leq P \leq 0.9$ mm  Condition (5)

When the groove pitch P falls within the range of condition (5), it is easy to obtain a high-resolution (definition) image, compared to a case where the groove pitch is less than the range of condition (5).

Moreover, the groove pitch P may satisfy the following conditions.

In a position at a distance of 0 mm from the optical axis LC: $1.35 \leq P \leq 2.97$ mm In a position at a distance of 5 mm from the optical axis LC: $0.375 \leq P \leq 0.80$ mm In a position at a distance of 10 mm from the optical axis LC: $0.30 \leq P \leq 0.66$ mm  Condition (6)

When the groove pitch P falls within the range of condition (6), it is easy to reduce concentric circles, compared to a case where the groove pitch P is greater than the range of condition (6).

Second Embodiment

Figure 6:
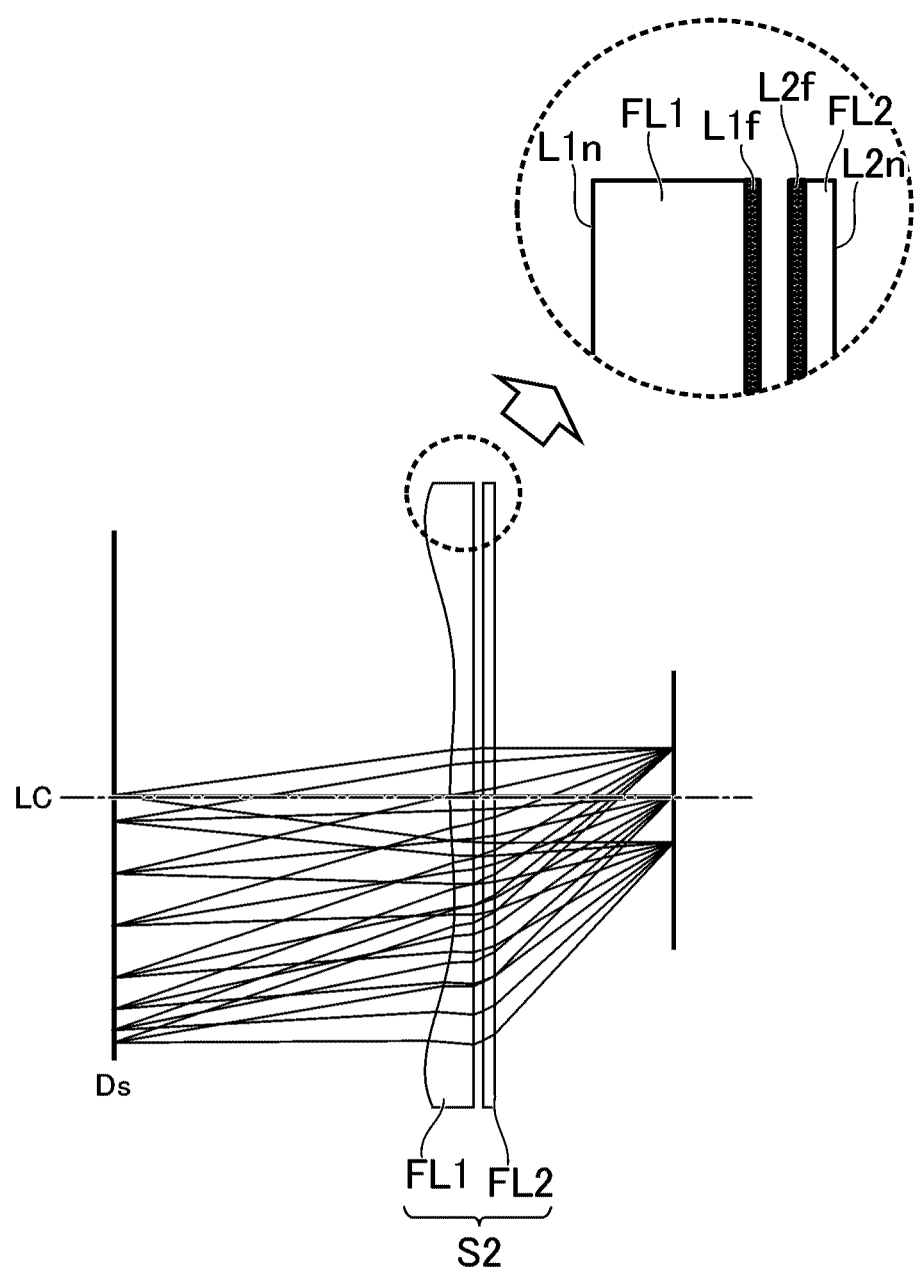
FIG. 6 is a diagram depicting a configuration example of a lens system which is proposed by the present disclosure and includes two Fresnel lenses.

FIG. 6 is a diagram depicting a configuration of the lens system S2 according to a second embodiment. The lens system S2 includes two Fresnel lenses FL1 and FL2 which are disposed side by side in the optical axis direction. The first Fresnel lens FL1 has a lens surface Lin directed to the display surface Ds side. The lens surface Lin is an aspherical lens surface, for example. The first Fresnel lens FL1 has a lens surface L1f having a Fresnel structure opposite to the lens surface Lin. The second Fresnel lens FL2 has a lens surface L2f being directed to the first Fresnel lens FL1 and having a Fresnel structure. Therefore, the lens surface L1f of the first Fresnel lens FL1 and the lens surface L2f of the second Fresnel lens FL2 are opposed to each other. The second Fresnel lens FL2 has a nearly flat surface L2n opposite to the lens surface L2f.

The structure of the lens system S2 is not limited to the example in FIG. 6. The surface Lin of the first Fresnel lens FL1 on the display surface Ds side does not need to be a lens surface. In still another example, both the lens surface L1f (a surface having a Fresnel structure) of the first Fresnel lens FL1 and the lens surface L2f (a surface having a Fresnel structure) of the second Fresnel lens FL2 may be directed to the display surface Ds side or may be directed to a side opposite to the display surface Ds.

In each of the lens surfaces L1f and L2f of the Fresnel lenses FL1 and FL2, a plurality of grooves (reference sign R in FIG. 1) that is concentrically arranged is formed. Each projection (prism) is formed between two adjacent grooves. In each of the Fresnel lenses FL1 and FL2, both the groove pitch which is the distance between two adjacent grooves and the groove depth vary with the distance from the optical axis LC (lens center), similarly to those in the Fresnel lens FL of the lens system S1. That is, a range where the groove pitch gradually varies with the distance from the optical axis LC and a range where the groove depth gradually varies with the distance from the optical axis LC at least partially overlap with each other. The range where the groove pitch gradually varies and the range where the groove depth gradually varies do not need to be completely identical to each other.

In each of the Fresnel lenses FL1 and FL2, both the groove pitch and the groove depth vary with the distance from the optical axis LC (lens center). Therefore, for a reason similar to that in the lens system S1, it is easy to reduce concentric circles and form a high-resolution (definition) image.

In one example of each of the Fresnel lenses FL1 and FL2, the lens includes a range where the groove depth gradually increases with an increase of the distance from the optical axis LC. In at least a part of the range, the groove pitch gradually decreases with an increase of the distance from the optical axis LC. For example, in the whole range of the Fresnel lens FL1 or FL2, the groove pitch gradually decreases with an increase of the distance from the optical axis LC. For example, the decrease rate of the groove pitch is high in a range of 0 mm to a prescribed distance (e.g., 10 mm) and is low in a range exceeding the prescribed distance. Alternatively, the value of the groove pitch may be fixed in the range exceeding the prescribed distance. On the other hand, regarding the groove depth, there may be a range where the groove depth gradually decreases and a range where the groove depth gradually increases. For example, the groove depth may gradually decrease in a range of a prescribed distance (e.g., 10 mm) or less and may gradually increase in a range exceeding the prescribed distance. Alternatively, the groove depth may gradually increase in a range of a prescribed distance (e.g., 30 mm) or less and may gradually decrease in a range exceeding the prescribed distance.

It is to be noted that each of the lens surface L1$f$ of the Fresnel lens FL1 and the lens surface L2$f$ of the Fresnel lens FL2 may be formed in such a way that the middle points (n1, n2, n3, etc., in FIG. 4), in the height direction (groove depth direction), of projections (prisms) each formed between two adjacent grooves are arranged on a horizontal plane, similarly to those in the lens surface L$f$ of the Fresnel lens FL of the lens system S1.

Figure 7:
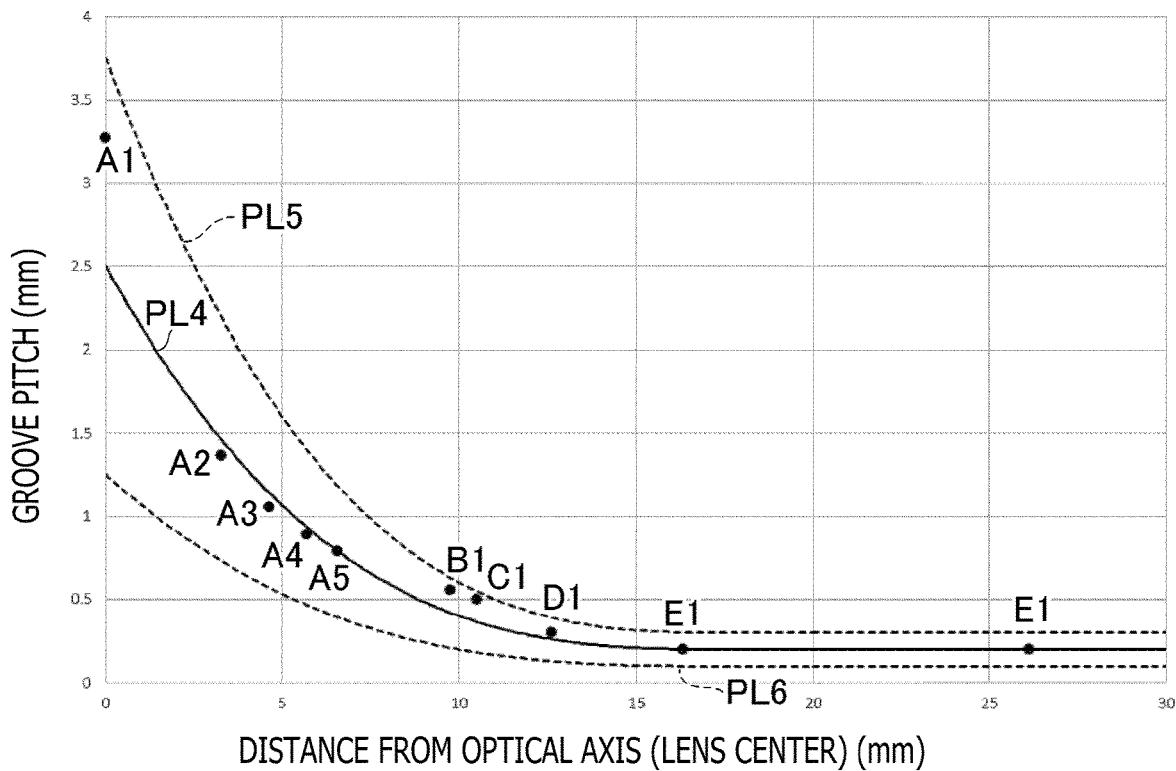
FIG. 7 is a graph depicting a condition of a groove pitch and a distance from an optical axis in the configuration of the lens system depicted in FIG. 6.

FIG. 7 is a graph depicting the groove pitch P in the lens system S2 including the two Fresnel lenses FL1 and FL2. In this graph, a solid line PL4 indicates the following formula (2).

$$0 \text{ mm} \leq X \leq 18 \text{ mm}: P = -0.00039(X-18)^3 + 0.2$$

$$18 \text{ mm} < X : P = 0.2 \text{ mm} \qquad \text{Formula (2)}:$$

It is to be noted that, also in the graph in FIG. 7, "P" and "X" in the formula (2) represents a groove pitch (mm) and a distance (mm) from the optical axis LC (lens center), respectively. Further, in the graph in FIG. 7, the groove pitch at a distance of 0 mm from the optical axis LC means a distance from the optical axis LC to the innermost groove.

It is desirable that, when 0 mm≤X≤18 mm, X and P satisfy the following conditions, as indicated by a broken line PL5 and a broken line PL6 in FIG. 7.

Broken line $PL5$: $P \leq (-0.00039(X-18)^3 + 0.2) \times 1.5$

Broken line $PL6$: $P \geq (-0.00039(X-18)^3 + 0.2) \times 0.5$ \qquad Condition (7-1):

When the groove pitch falls within the range of condition (7-1), it is easy to reduce concentric circles, compared to a case where the groove pitch P is greater than the range of condition (7-1). In addition, it is easy to obtain a high-resolution (definition) image, compared to a case where the groove pitch is less than the range of condition (7-1).

Further, it is desirable that, when 18 mm<X, the groove pitch P satisfy the following conditions.

Broken line $PL5$: $P \leq 0.3$

Broken line $PL6$: $0.1 \leq P$ \qquad Condition (7-2):

When the groove pitch satisfies the range of condition (7-2), it is easy to reduce concentric circles in the range where 18 mm<X, compared to a case where the groove pitch is greater than the range of condition (7-2). In addition, it is easy to obtain a high-resolution (definition) image in a range where 18 mm<X, compared to a case where the groove pitch is less than the range of condition (7-2).

It is to be noted that, on each of the lens surface L1$f$ of the Fresnel lens FL1 and the lens surface L2$f$ of the Fresnel lens FL2, inclined surfaces obtained by dividing a spherical or aspherical lens surface into multiple regions at a groove pitch are arranged on a horizontal plane. Therefore, when the surface shape and the groove pitch of a lens surface that is the base of the lens surface L1$f$ of the Fresnel lens FL1 or the lens surface L2$f$ of the Fresnel lens FL2 are determined, the groove depth is automatically determined. The surface shape of a lens surface that is the base of the lens surface L1$f$ of the Fresnel lens FL1 or the lens surface L2$f$ of the Fresnel lens FL2 may be designed according to optical performance that is desired for an image observation apparatus employing the lens system S2.

When 0 mm≤X≤18 mm, the groove pitch P and the distance X from the optical axis LC in each of the two Fresnel lenses FL1 and FL2 may satisfy the following conditions.

$$P \leq (-0.00039(X-18)^3 + 0.2) \times 1.5$$

$$P \geq (-0.00039(X-18)^3 + 0.2) \times 0.9 \qquad \text{Condition (8-1)}:$$

When the groove pitch satisfies the range of condition (8-1), it is easy to obtain a high-resolution (definition) image, compared to a case where the groove pitch is less than the range of condition (8-1).

Also, it is desirable that, when 18 mm<X, the groove pitch P satisfy the following condition.

$$0.18 \leq P \leq 0.30 \qquad \text{Condition (8-2)}:$$

When the groove pitch satisfies the range of condition (8-2), it is easy to reduce concentric circles in the range where 18 mm<X.

When 0 mm≤X≤18 mm, the groove pitch P and the distance X from the optical axis LC in each of the two Fresnel lenses FL1 and FL2 may satisfy the following conditions.

$$P \leq (-0.00039(X-18)^3 + 0.2) \times 1.2$$

$$P \geq (-0.00039(X-18)^3 + 0.2) \times 0.5 \qquad \text{Condition (9-1)}:$$

When the groove pitch satisfies the range of condition (9-1), it becomes easier to reduce concentric circles.

Also, it is desirable that, when 18 mm<X, the groove pitch P satisfy the following condition.

$$0.10 \leq P \leq 0.24 \qquad \text{Condition (9-2)}:$$

When the groove pitch satisfies the range of condition (9-2), it becomes easier to reduce concentric circles in the range where 18 mm<X.

Also, it is desirable that the groove pitch P satisfy the following conditions.

In a position at a distance of 0 mm from the optical axis LC: $1.25 \leq P \leq 3.75$ mm In a position at a distance of 5 mm from the optical axis LC: $0.53 \leq P \leq 1.59$ mm In a position at a distance of 18 mm or larger from the optical axis LC: $0.10 \leq P \leq 0.30$ mm  Condition (10)

When the groove pitch falls within the range of condition (10), it is easy to reduce concentric circles, compared to a case where the groove pitch is greater than the range of condition (10). In addition, it is easy to obtain a high-resolution (definition) image, compared to a case where the groove pitch is less than the range of condition (10). It is to be noted that, under condition (10), $0.20 \leq P \leq 0.60$ mm may be satisfied in a point at a distance of 10 mm from the optical axis LC. Further, the groove pitch P may satisfy the following conditions.

In a position at a distance of 0 mm from the optical axis LC: $2.22 \leq P \leq 3.75$ mm In a position at a distance of 5 mm from the optical axis LC: $0.95 \leq P \leq 1.59$ mm In a position at a distance of 18 mm or larger from the optical axis LC: $0.18 \leq P \leq 0.30$ mm  Condition (11)

When the groove pitch P falls within the range of condition (11), it is easy to obtain a high-resolution (definition) image, compared to a case where the groove pitch is less than the range of condition (11). It is to be noted that, under condition (11), $0.35 \leq P \leq 0.60$ mm may be satisfied in a position at a distance of 10 mm from the optical axis LC.

Further, the groove pitch P may satisfy the following conditions.

In a position at a distance of 0 mm from the optical axis LC: $1.24 \leq P \leq 2.97$ mm In a position at a distance of 5 mm from the optical axis LC: $0.53 \leq P \leq 1.27$ mm In a position at a distance of 18 mm or larger from the optical axis LC: $0.10 \leq P \leq 0.24$ mm  Condition (12)

When the groove pitch P falls within the range of condition (12), it is easy to reduce concentric circles, compared to a case where the groove pitch P is greater than the range of condition (12). It is to be noted that, under condition (12), $0.20 \leq P \leq 0.48$ mm may be satisfied in a position at a distance of 10 mm from the optical axis LC.

Further, the groove pitch P may satisfy the following conditions.

In a position at a distance of 0 mm from the optical axis LC: $2.22 \leq P \leq 3.75$ mm In a position at a distance of 5 mm from the optical axis LC: $0.53 \leq P \leq 1.27$ mm In a position at a distance of 18 mm or larger from the optical axis LC: $0.10 \leq P \leq 0.30$ mm  Condition (13)

When the groove pitch P falls within the range of condition (13), it is easy to obtain a high-resolution (definition) image at the lens center portion. It is to be noted that, under condition (13), $0.20 \leq P \leq 0.48$ mm may be satisfied in a position at a distance of 10 mm from the optical axis LC.

In the lens system S2, the lens surfaces L1$f$ and L2$f$ each adopting a Fresnel structure are opposed to each other. Therefore, differently from a case where, for example, the lens surfaces L1$f$ and L2$f$ each adopting a Fresnel structure are directed toward the same direction, the structure of the lens system S2 can be approximated to a symmetrical structure with respect to the center (for example, a plane orthogonal to the optical axis and positioned between the two lenses FL1 and FL2), of the lens system, in the optical axis direction. As a result, it becomes easy to correct an image surface curvature (astigmatism), which is difficult to reduce on a display device of an image observation apparatus. That is, it becomes easy to cancel the total aberration by compensating an aberration due to the lens surface L1$f$ and an aberration due to the lens surface L2$f$. In addition, since the lens surfaces L1$f$ and L2$f$ each having a Fresnel structure are opposed to each other, adhesion of dirt or dust to the two lens surfaces L1$f$ and L2$f$ can be suppressed. The gap between the lens surfaces L1$f$ and L2$f$ may be sealed with a sealing material attached on the edges of the two lenses FL1 and FL2. Thus, adhesion of dirt or dust to the lens surfaces L1$f$ and L2$f$ can be more effectively suppressed.

Procedures of Specifying Conditions

Hereinafter, procedures of specifying the aforementioned conditions of the groove pitch will be explained.

Figure 26:
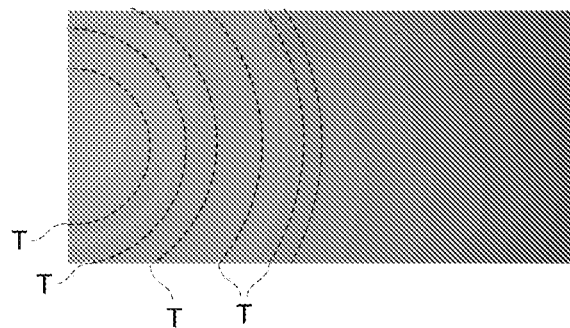
FIG. 26 is a diagram depicting concentric circles (gradation change) which are generated by use of a conventional Fresnel lens.

As depicted in FIG. 1, in a Fresnel lens, a plurality of grooves R that is arranged in the radial direction about an optical axis LC (lens center) is formed, and each prism 3 having an inclined surface 3$a$ that generates refraction of light for obtaining a formed image and a vertical surface 3$b$ that does not make any contribution to image forming is formed between two adjacent grooves R. Therefore, a Fresnel lens conventionally generates concentric circles (T depicted in FIG. 26, a gradation change) caused by the vertical surfaces 3$b$.

Generation of concentric circles depends on the groove pitch. When the groove pitch is reduced, light having passed through inclined surfaces 3$a$ disposed on both sides of a vertical surface 3$b$ of a prism arrives at a region that is darkened due to the vertical surface 3$b$. Accordingly, the gradation change becomes small. That is, when the groove pitch is reduced, generation of concentric circles is suppressed. On the other hand, when the groove pitch is reduced, an error of the angle of each inclined surface 3$a$ is likely to be generated. Accordingly, a formed image is likely to have a low resolution (definition). In addition, whether or not a concentric circle due to a certain vertical surface 3$b$ can be seen also depends on the sight line angle (in other words, the distance from the optical axis LC to the vertical surface 3$b$) of human pupils. Therefore, in order to obtain any of the aforementioned conditions of the groove pitch, a plurality of Fresnel lenses the groove pitch of which was known in advance was prepared, and still pictures were observed through the plurality of Fresnel lenses. Then, the invisibility degree of concentric circles in each of the still pictures was evaluated. The invisibility degree of concentric circles was evaluated with respect to a distance from the optical axis LC. Subsequently, from the viewpoint of concentric circles and a resolution, a desired range of the groove pitch was obtained with respect to a distance from the optical axis LC.

Hereinafter, formulas and numerical values for defining the aforementioned conditions will be more specifically explained.

Multiple lens systems each including one or two Fresnel lenses were prepared. Fresnel lenses the groove pitch of which was known in advance were used. These Fresnel lenses were conventional ones. In each of these Fresnel lenses, either the groove pitch or the groove depth was fixed independently from the distance from the optical axis LC (lens center).

Photographing Condition

Figure 8:
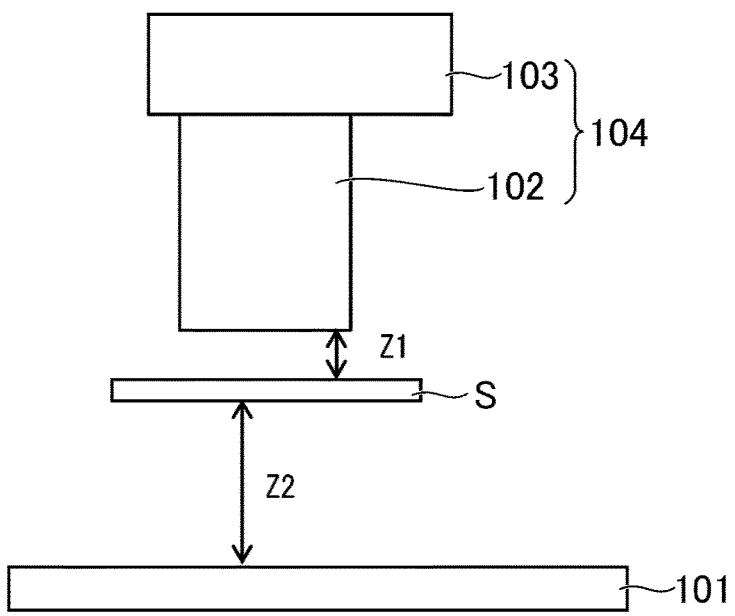
FIG. 8 is a diagram for explaining the procedures of obtaining the conditions depicted in FIGS. 5 and 7, and depicts a photographing condition of a prepared lens system.

Next, an image the brightness of which was uniform over the whole area of a display region was photographed through each of the prepared Fresnel lenses (lens systems). FIG. 8 is a diagram depicting the photographing condition in this case. As depicted in FIG. 8, a lens system S was disposed separately from a display device 101, and a camera unit 104 including a camera body 103 and a lens 102 was disposed separately from the lens system S. A distance Z1 from the lens system S to the camera unit 104 was set to 12 mm. "Galaxy S8" manufactured by Samsung Electronics Co., Ltd., "a6500" manufactured by Sony Corporation, and "SEL1018" manufactured by Sony Corporation were used for the display device 101, the camera body 103, and the lens 102, respectively. It is to be noted that the position of the lens system S (a distance Z2 from the display device 101) was adjusted in such a way that a black matrix for defining pixels of the display device 101 was not included in the photographed image because there was a possibility that the black matrix became noise against evaluation of concentric circles. In addition, when a screen is brighter, concentric circles are more likely to be generated. Therefore, the aperture of the camera body 103 was set to F4.0 comparable to φ2.5 mm which is the size of a human pupil under a bright environment. Moreover, the exposure of the camera body 103 was adjusted such that a photographed image that was as bright as possible was obtained while no halation was generated.

[Concentric-Circle Evaluation Value]

Figure 9:
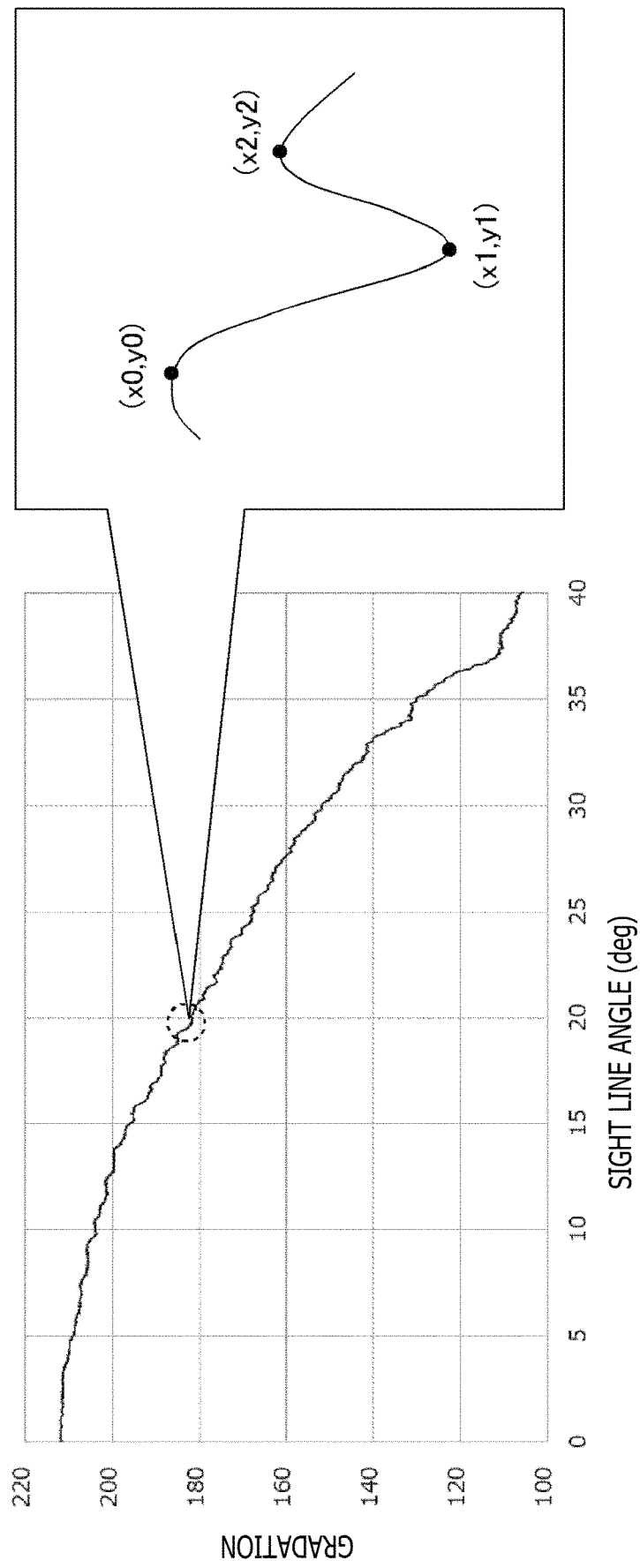
FIG. 9 is a diagram for explaining the procedures of obtaining the conditions depicted in FIGS. 5 and 7, and depicts the relation between a gradation in a photographed image and a sight line angle.
Figure 10:
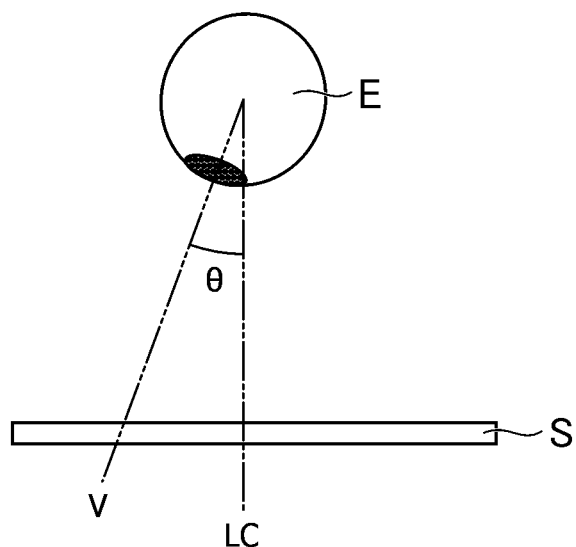
FIG. 10 is a diagram for explaining a sight line angle.

As depicted in the graph in FIG. 9, a gradation value depending on a sight line angle was obtained from each of the photographed images. Specifically, the relation between coordinates on a photographed image and the sight line angle was calculated by ray tracing (computation of optical paths). Subsequently, the relation between the sight line angle and the gradation value was obtained on the basis of the relation between the coordinates and the gradation value obtained from the photographed image. The gradation value thus obtained gradually decreased with the sight line angle. Here, the sight line angle is the angle $\theta$ of a sight line V relative to the optical axis LC (see FIG. 10).

The spatial frequency and the inverse of a contrast were calculated on the basis of a change in the gradation value. The spatial frequency is defined by the following formula such that the spatial frequency corresponding to the sight line angle can be calculated.

$$\omega = 1/(x2-x0)$$

where "$\omega$" represents a spatial frequency, and "x0" and "x2" represent sight line angles at adjacent two peaks, as depicted in FIG. 9. Further, the inverse of the contrast is defined by the following formula.

$$Ci = (\text{AVERAGE}(y2,y0)+y1)/(\text{AVERAGE}(y2,y0)-y1)$$

where Ci represents the inverse of a contrast, and y0, y1, and y2 represent gradation values in positions at which the sight line angle is x0, x1, and x2, respectively. In addition, AVERAGE (y2, y0) represents the average of two adjacent peaks (hereinafter, the inverse of the contrast is referred to as a "contrast inverse").

It has been known that examples of the frequency (spatial frequency) of a gradation change include a frequency at which human pupils are likely to sense a contrast (gradation change) and a frequency at which human pupils are less likely to sense a contrast. The relation between a spatial frequency and a human-eyes' contrast sensitivity is disclosed in the document below. A contrast sensitivity is a value indicating the limit of a contrast which human eyes can recognize. A contrast sensitivity is indicated by the inverse of a contrast limit. "F. L. Van Nes, J. J. Koenderink, H. Nas, and M. A. Bouman, (1967), Spatiotemporal Modulation Transfer in the Human Eye, Journal of the Optical Society of America Vol. 57, Issue 9, pp. 1082-1088"

Figure 11A:
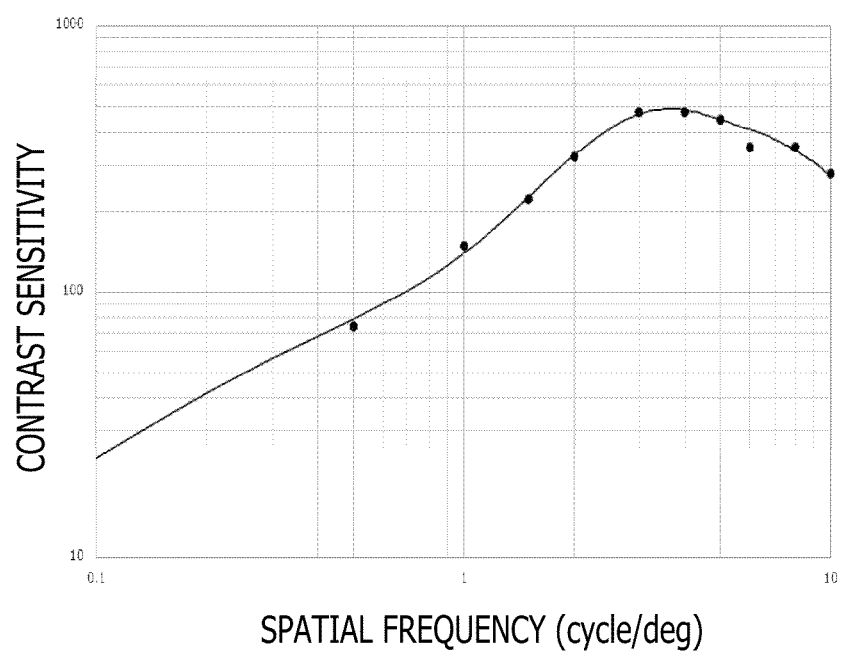
FIG. 11A is a graph depicting the relation between a spatial frequency and a human contrast sensitivity.
Figures 11B, 12A:
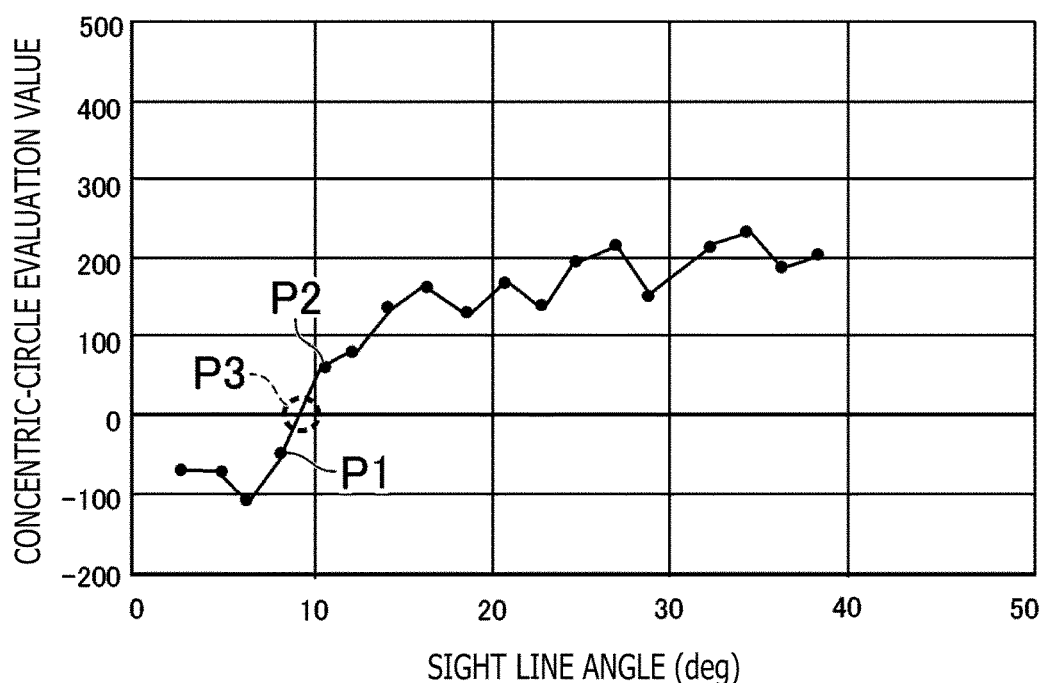
FIG. 11B is a table depicting a coefficient for defining an approximation formula of a curve depicted in FIG. 11A.
FIG. 12A is a diagram for explaining the procedures of obtaining the conditions in FIGS. 5 and 7, and depicts a concentric-circle evaluation value obtained from a photographed image.

FIG. 11A is a graph depicting the relation between a contrast sensitivity and a spatial frequency proposed by the above document. An approximation formula regarding the relation between a contrast sensitivity and a spatial frequency was obtained with reference to the above document. In the range where the spatial frequency $\omega$ is 0.1 to 10, a contrast sensitivity and a spatial frequency have a relation expressed by the following approximation formula.

$$Cs = A1 \times \omega + A2 \times \omega^2 + A3 \times \omega^3 + A4 \times \omega^4 + A5 \times \omega^5 + A6 \times \omega^6 + A7 \times \omega^7 + A8 \times \omega^8 + A9\ \omega^9$$

where Cs represents a contrast sensitivity, $\omega$ represents a spatial frequency, and A1 to A9 are the coefficients depicted in a table in FIG. 11B.

A concentric-circle evaluation value was calculated on the basis of the difference between a contrast inverse obtained from a photographed image and a contrast sensitivity obtained from the above approximation formula. A concentric-circle evaluation value indicates an invisibility degree of concentric circles. For example, a great concentric-circle evaluation value indicates that a gradation change corresponding to the concentric-circle evaluation value is less likely to be recognized as concentric circles by the observer. A concentric-circle evaluation value was calculated on the basis of the following formula (3).

$$\eta = Ci - Cs + 5 \times (\theta - 40) \qquad \text{Formula (3):}$$

where "$\eta$" represents a concentric-circle evaluation value, "Ci" represents a contrast inverse obtained from a photographed image, "Cs" represents a contrast sensitivity expressed by the above spatial frequency $\omega$ and the coefficients A1 to A9 (see FIG. 11B), and "$\theta$" represents a sight line angle. It is to be noted that three points depicted in FIG. 9 are necessary to calculate the concentric-circle evaluation value $\eta$. Therefore, the concentric-circle evaluation value $\eta$ can be calculated in a position including a minimum value (y1 in FIG. 9).

The human-pupils' sensitivity to a contrast (gradation change) varies depending on the sight line angle. When human pupils are directed toward an optical axis (when the sight line angle $\theta = 0$), the visual recognition capability to a contrast becomes maximum. With rotation of the pupils, the recognition capability to a contrast is degraded. Thus, in the formula (3), "$5 \times (\theta - 40)$" is added to "Ci-Cs." As a result, when the pupils are directed towards the optical axis (when $\theta = 0$ deg), "−200" is added as a correction value to the concentric-circle evaluation value, and when the pupils are rotated to the maximum (when $\theta = 40$ deg), the correction value is 0. When the concentric-circle evaluation value calculated from the formula (3) by use of such a correction value is greater than 0, a gradation change indicated by the concentric-circle evaluation value is considered to be so small that the gradation change is not recognized as concentric circles by human beings. On the other hand, when the concentric-circle evaluation value calculated from the formula (3) is much lower than 0, there is a possibility that a gradation change indicated by the concentric-circle evaluation value is recognized as concentric circles by human beings.

For this reason, when the groove pitch is set so as not to generate a concentric-circle evaluation value that is much less than 0, a Fresnel lens that does not generate any concentric circle can be obtained. Therefore, on the basis of results obtained by use of the lens systems with a reference value for a concentric-circle evaluation value set to 0, a groove pitch at which the concentric-circle evaluation value was equal to or greater than 0 was obtained.

Specifically, from the relation (see FIG. 9) between a gradation value and a sight line angle obtained for each prepared Fresnel lens (lens system S), a contrast inverse Ci and a spatial frequency ω corresponding to a sight line angle θ were calculated. Then, a concentric-circle evaluation value η corresponding to the sight line angle θ was calculated with use of the formula (3). As explained previously, the groove pitch in a Fresnel lens included in the lens system S for photographing an image was known in advance. Thus, a sight line angle at which the concentric-circle evaluation value was 0 or close to 0 was identified, a prism 3 (see FIG. 1) located at the sight line angle was identified, and the groove pitch of the prism 3 relative to an adjacent prism 3 was obtained.

Figure 12B:
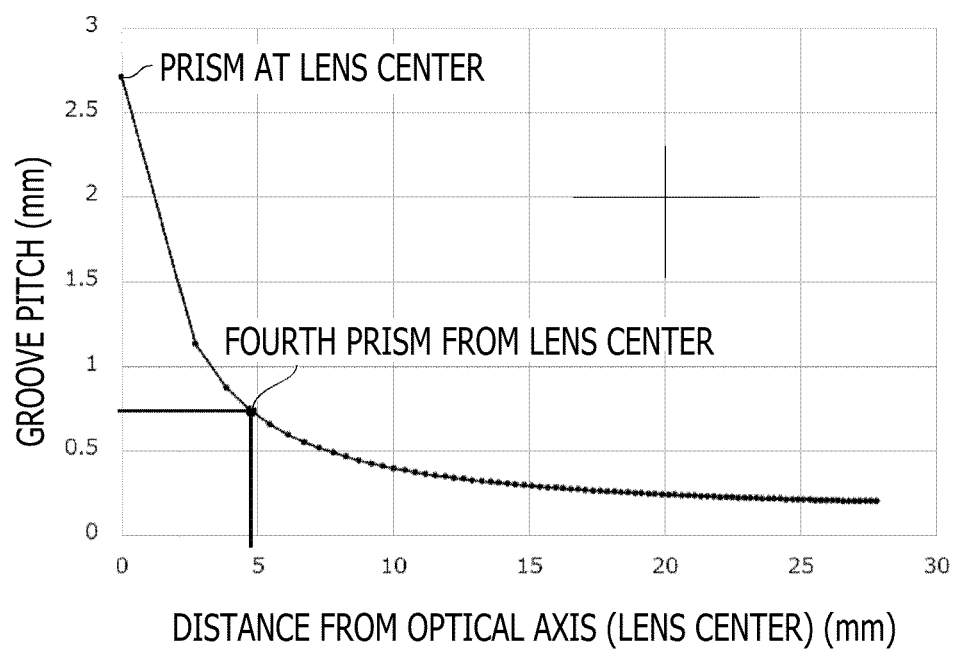
FIG. 12B is a diagram for explaining the procedures of obtaining the conditions in FIGS. 5 and 7, and depicts an example of a groove pitch in a lens system that is used for photographing an image.

This operation will be explained with use of FIGS. 12A and 12B. FIG. 12A is a diagram depicting an example of a calculated concentric-circle evaluation value. In addition, in a Fresnel lens, there is a relation between a distance from an optical axis LC (lens center) and a groove pitch as depicted in FIG. 12B, for example. In FIG. 12B, groove pitch values are plotted at respective positions of prisms 3. In the graph in FIG. 12B, a groove pitch at a distance of 0 mm from the lens center means the distance from the lens center to the innermost groove. In other words, a groove pitch at a distance of 0 mm from the lens center is the radius of a prism 3 (prism 3A in FIG. 1) located on the lens center. Further, the groove pitch indicated by the second point corresponds to the width of the second prism 3 (prism 3B in FIG. 1) from the lens center. Also, the groove pitch indicated by the third point corresponds to the width of the third prism 3 (prism 3C in FIG. 1) from the lens center. Similarly, this applies to graphs each indicating the relation between the distance from the optical axis LC and the groove pitch for other lens systems (lens systems SA to SJ) that will be described later.

In the example in FIG. 12A, a concentric-circle evaluation value q that matches 0 is not obtained, but a concentric-circle evaluation value q is equal to 0 at an roughly intermediate position (a range surrounded by a broken line P3) between points P1 and P2. In this example, the sight line angle is approximately 9 degrees in the range surrounded by the broken line P3. In this case, a prism 3 that corresponds to the sight line angle of 9 degrees is identified by ray tracing. In the example in FIG. 12B, a prism 3 that corresponds to the sight line angle of 9 degrees is identified as the fourth prism by ray tracing. In this example, the fourth prism 3 is at a distance of 4.9 mm from the lens center and has a groove pitch of 0.75 mm. In this case, the groove pitch in a position at a distance of 4.9 mm from the optical axis LC (lens center) is set to be smaller than 0.75 mm, so that it is considered that generation of concentric circles can be sufficiently suppressed.

The aforementioned operation was executed for each of a plurality of the prepared lens systems such that desired groove pitches on a Fresnel lens were obtained at a plurality of positions. Then, the relation (PL1 depicted in FIG. 5, PL4 depicted in FIG. 7) between a distance from the optical axis LC and a desired groove pitch was obtained. Hereinafter, the results obtained from the plurality of prepared lens systems will be described. It is to be noted that a generation position of a concentric circle does not depend on the surface shape of a convex lens that is the base of each Fresnel lens. Moreover, a generation position of a concentric circle does not depend on the surface shape of a lens surface opposite to a lens surface having a Fresnel structure of the Fresnel lens, either. Therefore, a description of the surface shape of a lens surface in each lens system is omitted herein.

Lens System Including One Fresnel Lens

First, results obtained by lens systems SG, SH, SI each including only one Fresnel lens will be described. The lens systems SG, SH, SI each include one Fresnel lens FL.

Figure 13:
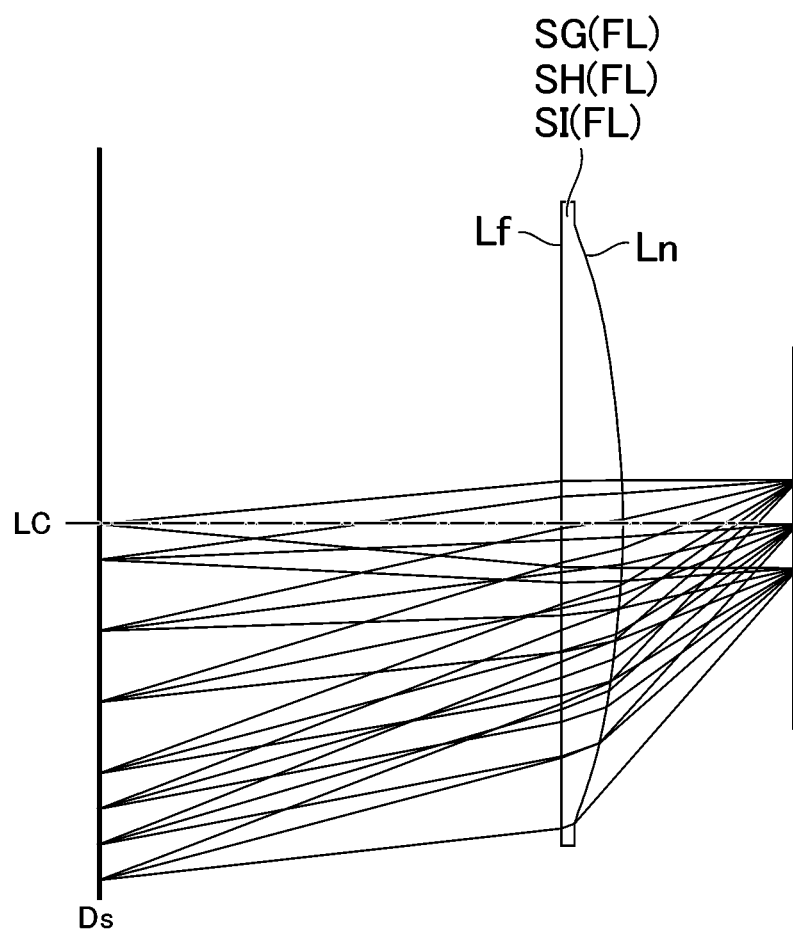
FIG. 13 is a diagram depicting a configuration of a lens system used to obtain the condition depicted in FIG. 5.

FIG. 13 is a diagram depicting a configuration of the lens system SG. The Fresnel lens FL included in the lens system SG has, on the display surface Ds side, a lens surface Lf having a Fresnel structure and has, on a side opposite to the lens surface Lf, a convex aspherical lens surface Ln.

It is to be noted that concentric circles are generated due to a vertical surface (vertical surface 3b in FIG. 1) of a prism included in a Fresnel structure. Therefore, the surface shape of the aspherical lens surface Ln does not affect generation of concentric circles. Further, the surface shape of a lens surface (in other words, the lens power of the lens surface Lf) that is the base of the lens surface Lf having a Fresnel structure does not affect generation of concentric circles, either.

Figure 14A:
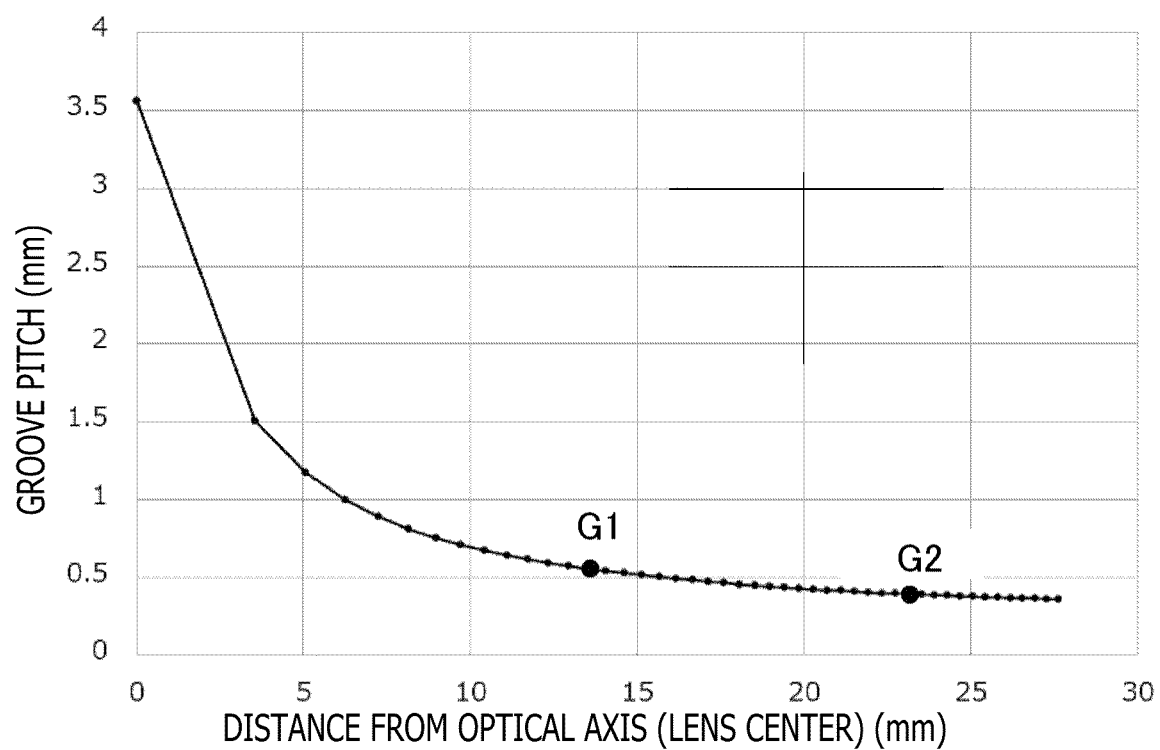
FIG. 14A is a graph depicting a groove pitch in a lens system SG used to obtain the condition depicted in FIG. 5.
Figure 14B:
FIG. 14B is a graph depicting a concentric-circle evaluation value obtained by use of the lens system SG.
Figure 16A:
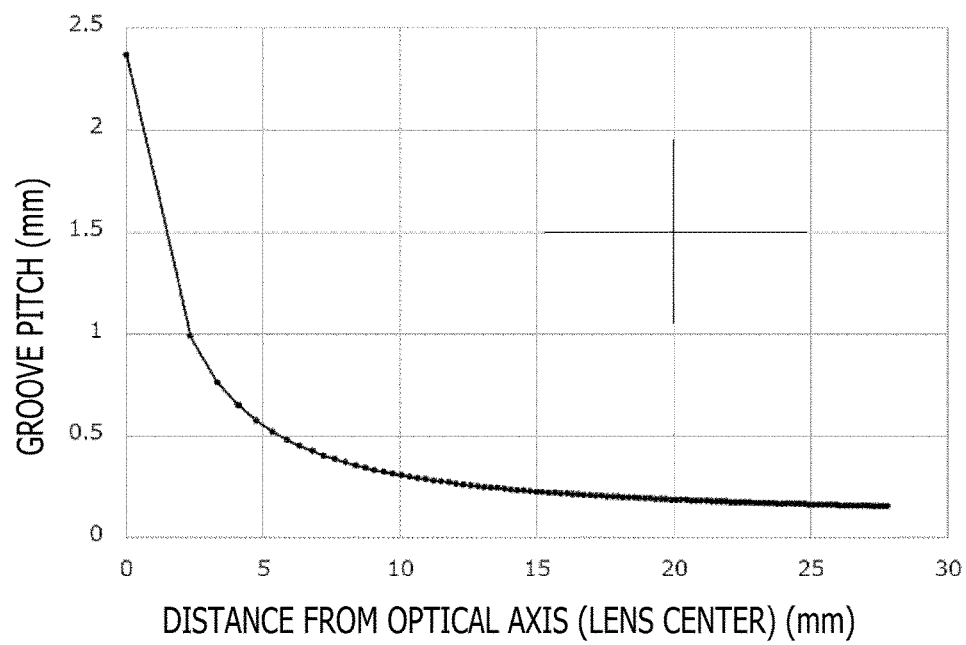
FIG. 16A is a graph depicting a groove pitch in a lens system SI used to obtain the condition depicted in FIG. 5.
Figures 16B, 17:
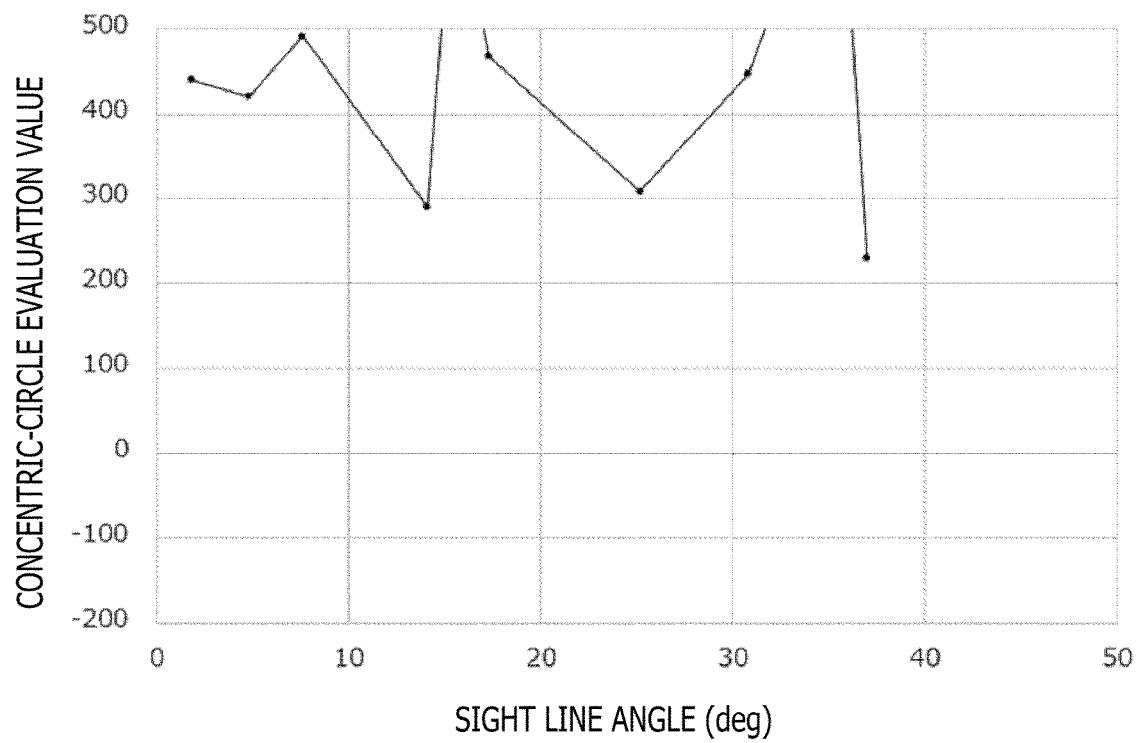
FIG. 16B is a graph depicting a concentric-circle evaluation value obtained by use of the lens system SI.
FIG. 17 is a table depicting a groove pitch selected to obtain the condition depicted in FIG. 5.

FIG. 14A is a graph depicting the relation between the distance from the optical axis LC and the groove pitch in the Fresnel lens FL included in the lens system SG. In the lens system SG, the groove depth was fixed to be 0.25 mm, independently from the distance from the optical axis LC. FIG. 14B is a graph depicting the relation between the concentric-circle evaluation value and the sight line angle obtained when the Fresnel lens FL was used. According to this graph, in the range G1 and the range G2, the concentric-circle evaluation value 1 was close to 0. By ray tracing, prisms corresponding to the ranges G1 and G2 were identified as prisms at the point G1 (sight line angle: 13.5 degrees (distance from the lens center: 7.2 mm)) and the point G2 (sight line angle: 23.2 degrees (distance from the lens center: 12.9 mm)), as depicted in FIGS. 14A and 17. The respective groove pitches in these prisms are depicted in the table presented in FIG. 17.

Figure 15A:
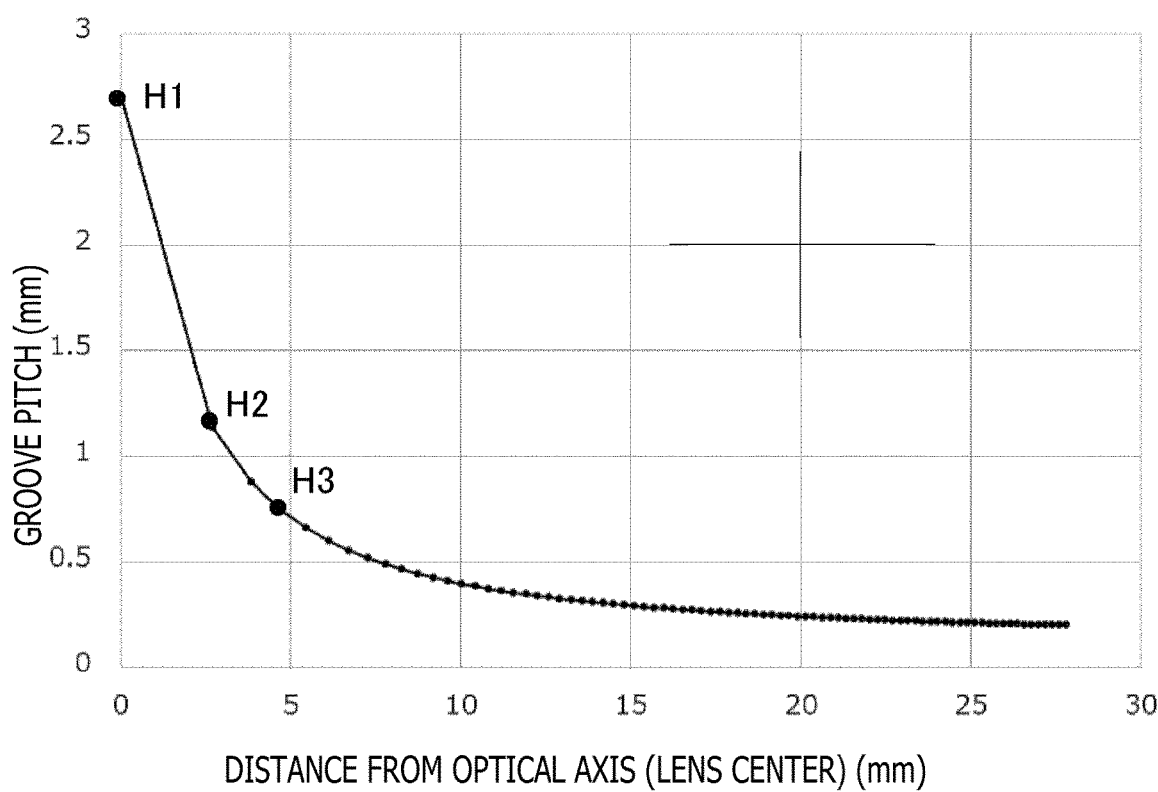
FIG. 15A is a graph depicting a groove pitch in a lens system SH used to obtain the condition depicted in FIG. 5.
Figure 15B:
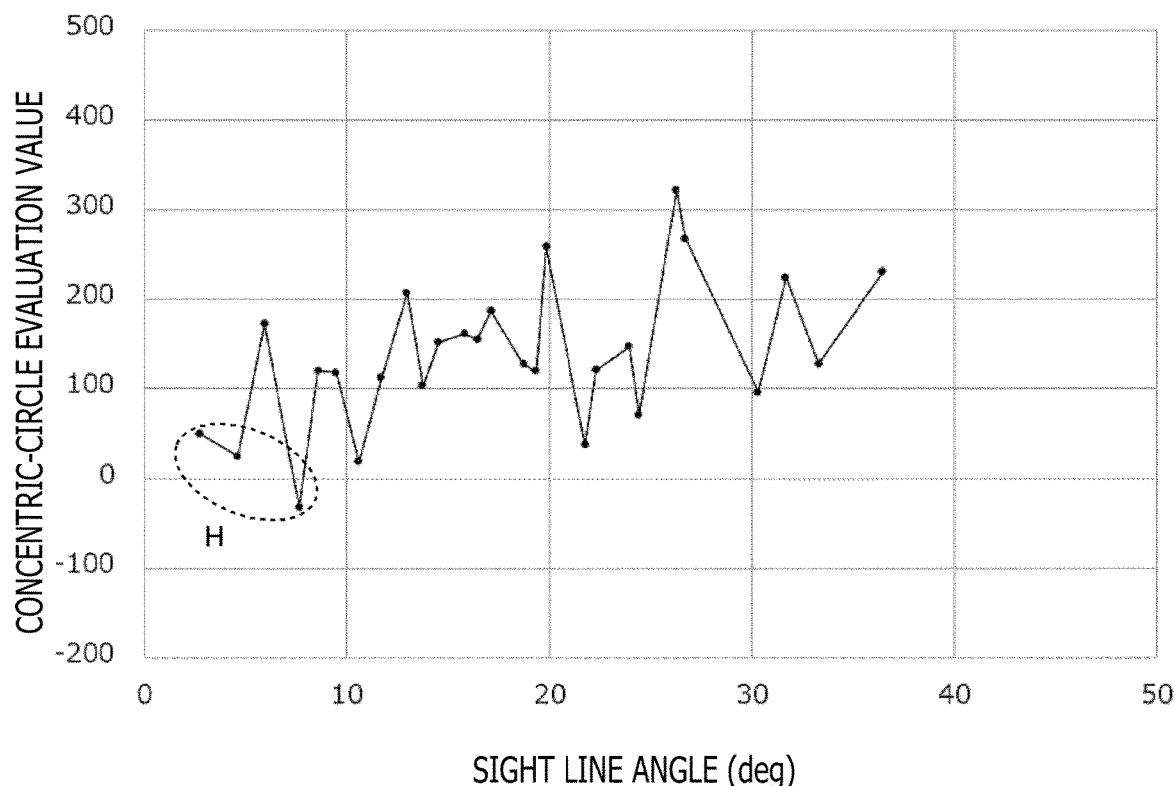
FIG. 15B is a graph depicting a concentric-circle evaluation value obtained by use of the lens system SH.

The Fresnel lens FL of the lens system SH has a lens surface Lf having a Fresnel structure on the display surface Ds side and has an aspherical convex lens surface Ln disposed opposite to the lens surface Lf (see FIG. 13), similarly to the aforementioned Fresnel lens FL of the lens system SG. FIG. 15A is a graph depicting the relation between the distance from the optical axis LC and the groove pitch in the Fresnel lens FL included in the lens system SH. In the lens system SH, the groove depth was fixed to be 0.15 mm, independently from the distance from the optical axis LC. FIG. 15B is a graph depicting the relation between the concentric-circle evaluation value and the sight line angle obtained when the Fresnel lens FL was used. According to this graph, the concentric-circle evaluation value q was 0 or close to 0 in the range indicated by a broken line H in FIG. 15B. By ray tracing, prisms corresponding to the range H were identified as prisms indicated by the points H1 to H3 presented in FIGS. 15A and 17. The respective groove pitches in these prisms are depicted in the table presented in FIG. 17.

The Fresnel lens FL of the lens system SI has a lens surface Lf having a Fresnel structure on the display surface Ds side and has an aspherical convex lens surface Ln disposed opposite to the lens surface Lf (see FIG. 13), similarly to the aforementioned Fresnel lens FL of the lens system SG. FIG. 16A is a graph depicting the relation between the distance from the optical axis LC and the groove pitch in the Fresnel lens FL included in the lens system SI. In the lens system SI, the groove depth was fixed to be 0.115 mm, independently from the distance from the optical axis LC. FIG. 16B is a graph depicting the relation between the concentric-circle evaluation value and the sight line angle obtained when the Fresnel lens FL of the lens system SI was used. According to this graph, the Fresnel lens FL of the lens system SI had a groove pitch smaller than those of the Fresnel lenses FL in the other lens systems SG and SH, and a value that was sufficiently greater than 0 was obtained as the concentric-circle evaluation value in any position.

The desirable condition of a groove pitch depicted in FIG. 5 was obtained in five points G1, G2, H1, H2, and H3 thus selected. That is, the formula (1) passing near the five points (G1, G2, H1, H2, and H3) depicted in FIG. 5 was obtained. The formula (1) is a function representing a groove pitch at which the concentric-circle evaluation value becomes 0 or close to 0. When the groove pitch is equal to or less than the value of "formula (1)×1.5," generation of concentric circles can be suppressed. In addition, when the groove pitch is reduced, the resolution of an image that can be obtained through the lens system is degraded. However, as long as the groove pitch is equal to or greater than the value of "formula (1)×0.5," an allowable result regarding the resolution can be obtained.

Lens System Including Two Fresnel Lenses

Next, results obtained by lens systems SA, SB, SC, SD, and SE each including two Fresnel lenses will be described.

Figure 18A:
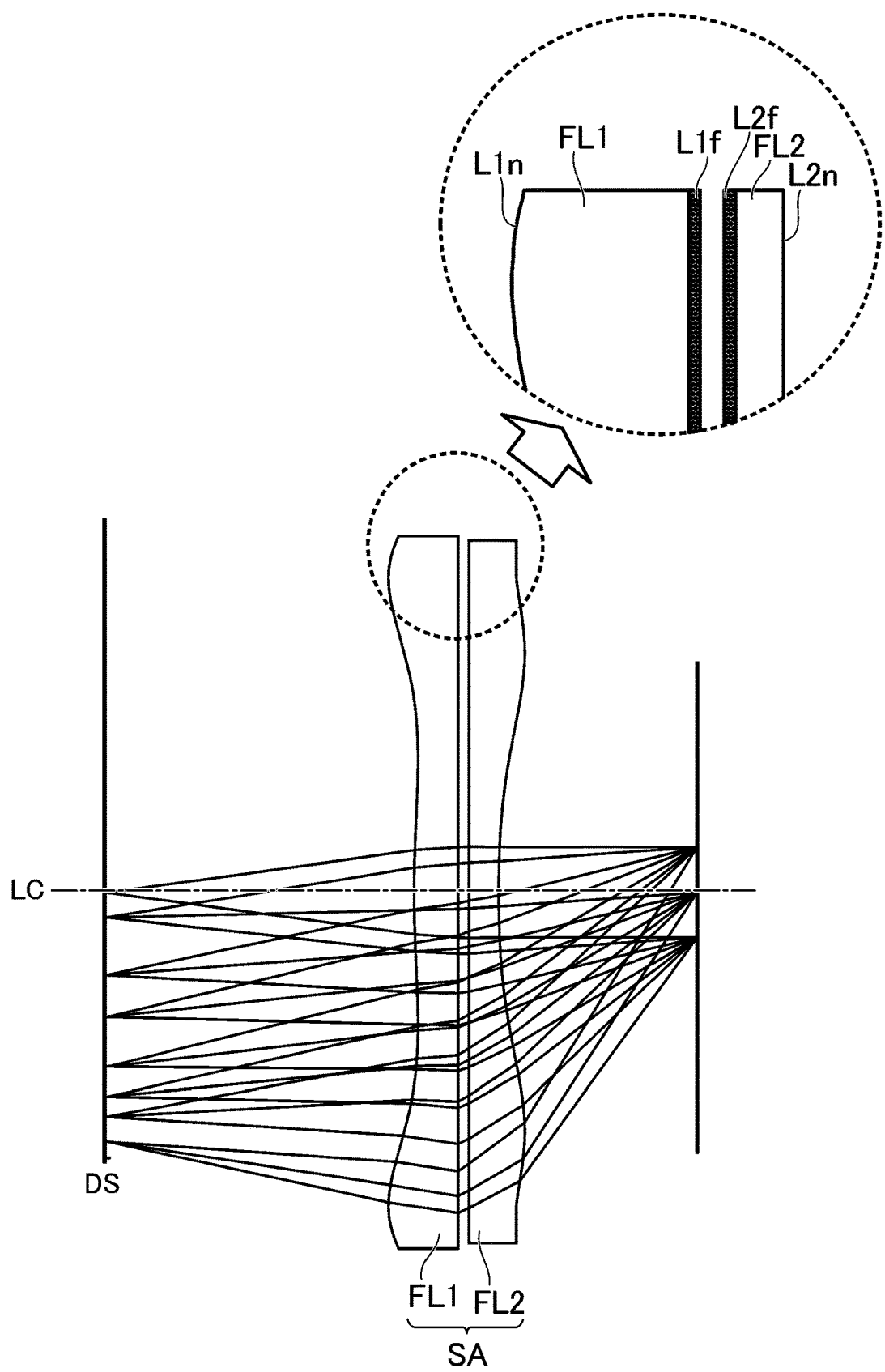
FIG. 18A is a diagram depicting a configuration of a lens system SA used to obtain the condition depicted in FIG. 7.

FIG. 18A is a diagram depicting a configuration of the lens system SA. The lens system SA includes a Fresnel lens FL1 and a Fresnel lens FL2. The first Fresnel lens FL1 has a lens surface L1n having an aspherical shape on the display surface Ds side and has a lens surface L1f having a Fresnel structure and being disposed opposite to the lens surface L1n. The second Fresnel lens FL2 has a lens surface L2f having a Fresnel structure and being opposed to the lens surface L1f of the first Fresnel lens FL1 and has a lens surface L2n having an aspherical shape and being disposed opposite to the lens surface L2f.

Figure 18B:
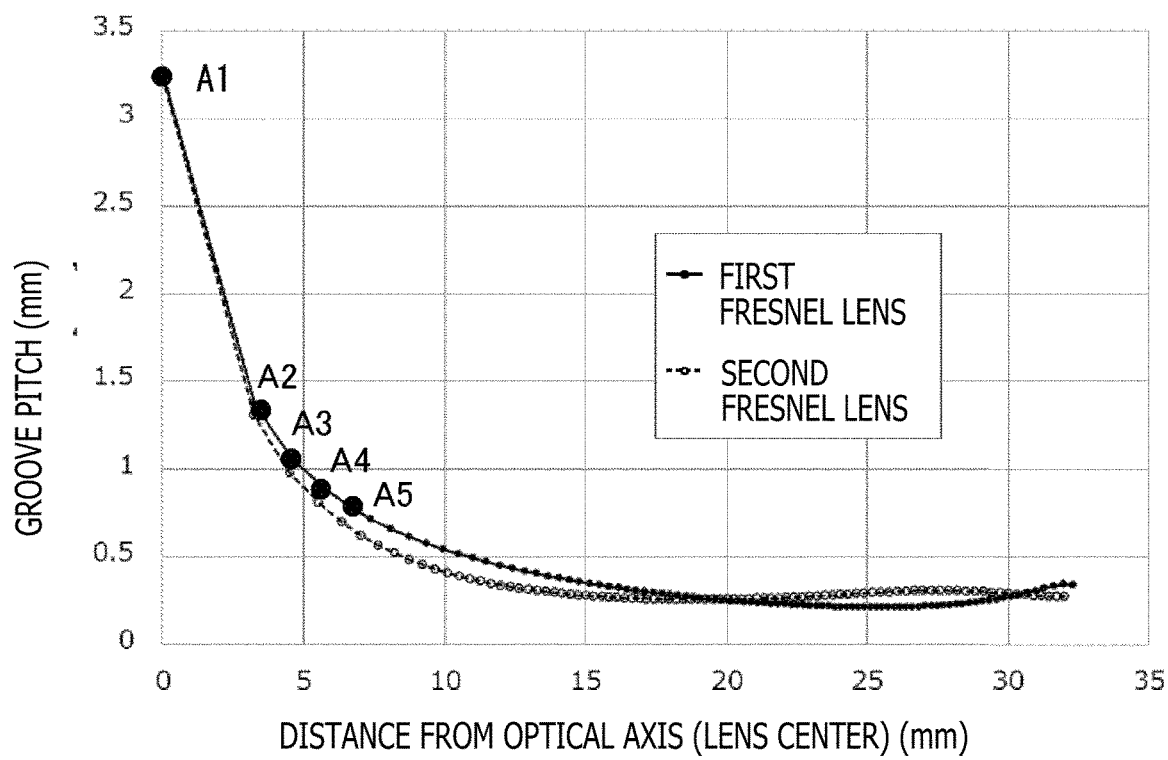
FIG. 18B is a graph depicting a groove pitch in the lens system SA.
Figure 18C:
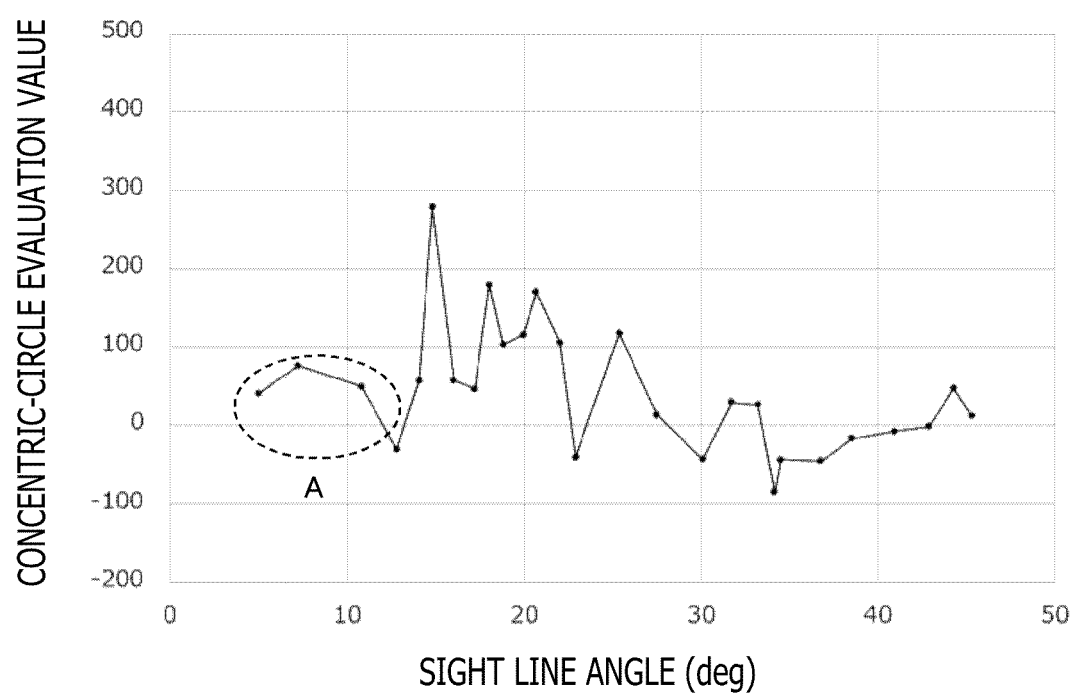
FIG. 18C is a graph depicting a concentric-circle evaluation value obtained by use of the lens system SA.

FIG. 18B is a graph depicting the relation between the distance from the optical axis LC and the groove pitch in each of the Fresnel lenses FL1 and FL2. The groove depth was fixed to be 0.15 mm, independently from the distance from the lens center. FIG. 18C is a graph depicting the relation between the concentric-circle evaluation value and the sight line angle obtained when the lens system SA was used. According to this graph, the concentric-circle evaluation value η was 0 or close to 0 in a range indicated by a broken line A in FIG. 18C. By ray tracing, prisms corresponding to the range A were identified as prisms indicated by the points A1 to A5 presented in FIGS. 18B and 23. The respective groove pitches in these prisms are depicted in the table presented in FIG. 23.

It is to be noted that, a Fresnel lens, between the two Fresnel lens FL1 and FL2, that has a larger pitch is surmised to affect generation of concentric circles in the lens system SA. As depicted in FIG. 18B, in each of the ranges corresponding to points A1, A2, and A3, the groove pitch in the first Fresnel lens FL1 was larger than the groove pitch in the second Fresnel lens FL2. Thus, the pitches in the first Fresnel lens FL1 were selected as groove pitches corresponding to the points A1, A2, and A3. Similarly, this applies to other lens systems that will be described later. That is, the value of the large one of the groove pitches in the two Fresnel lenses was selected as a groove pitch in a position at which a concentric-circle evaluation value is close to 0.

Figure 19A:
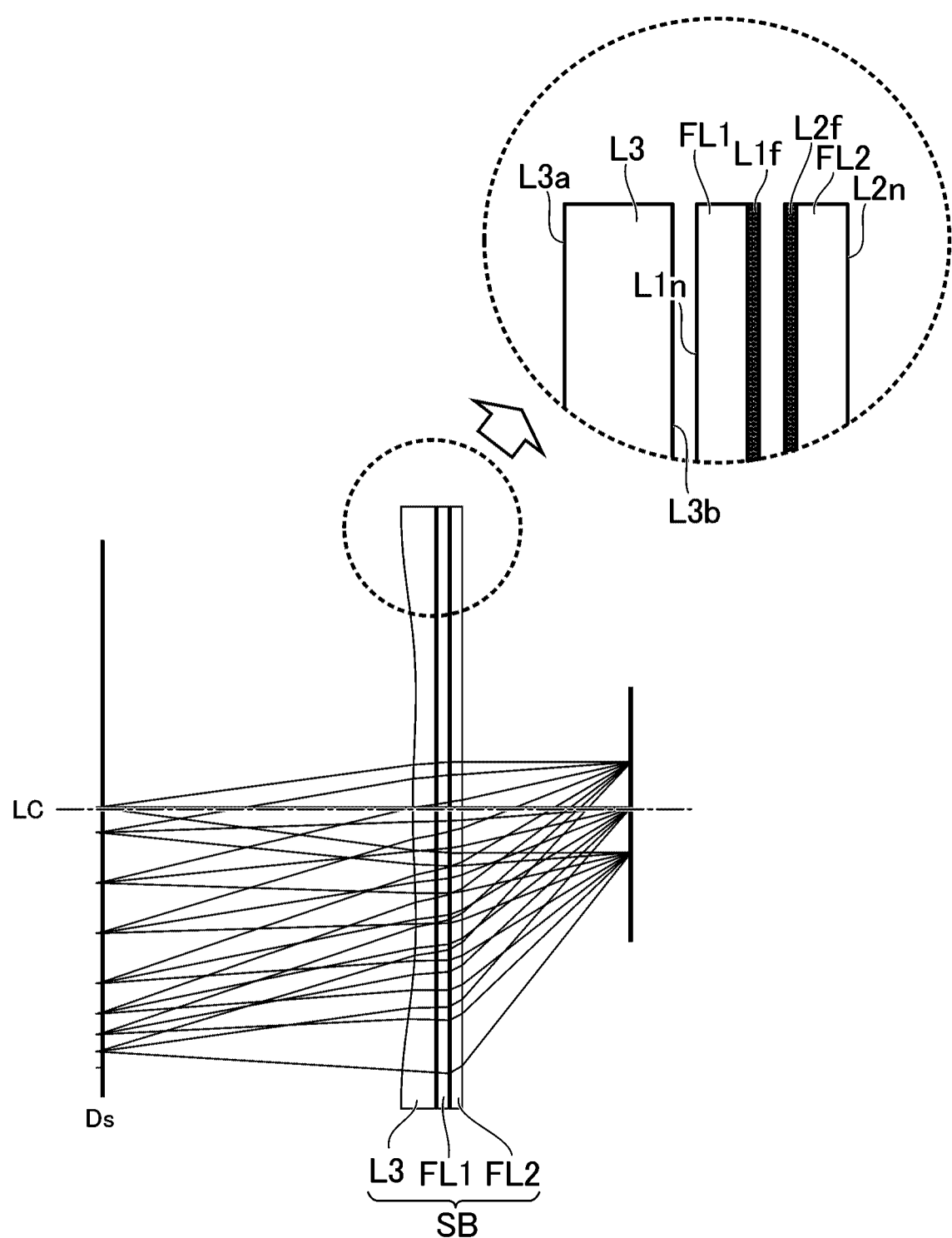
FIG. 19A is a diagram depicting a configuration of a lens system SB used to obtain the condition depicted in FIG. 7.

FIG. 19A is a diagram depicting a configuration of the lens system SB. The lens system SB includes an aspherical lens L3, the first Fresnel lens FL1, and the second Fresnel lens FL2. The aspherical lens L3 has, on the display surface Ds side, a lens surface L3a having an aspherical shape and has a nearly flat surface L3b disposed opposite to the lens surface L3a. The first Fresnel lens FL1 has a nearly flat surface L1n on the lens L3 side and has a lens surface L1f having a Fresnel structure and disposed opposite to the nearly flat surface L1n. The second Fresnel lens FL2 has a lens surface L2f that is opposed to the lens surface L1f of the first Fresnel lens FL1 and that has a Fresnel structure, and a nearly flat surface L2n that is disposed opposite to the lens surface L2f.

Figure 19B:
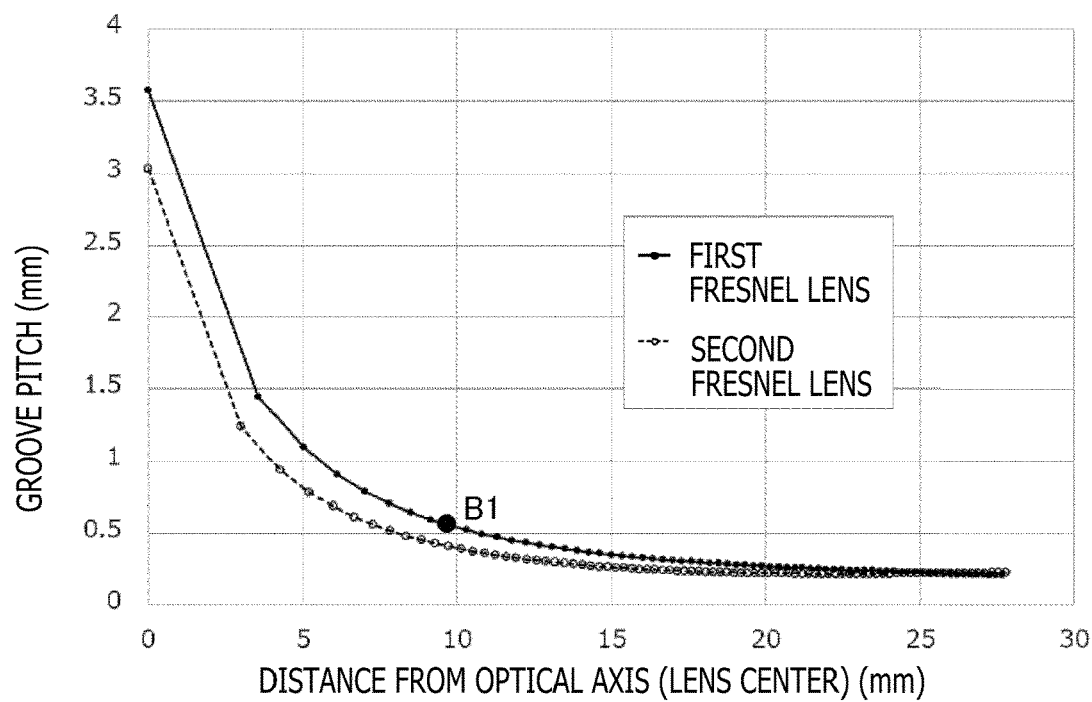
FIG. 19B is a graph depicting a groove pitch in the lens system SB.
Figure 19C:
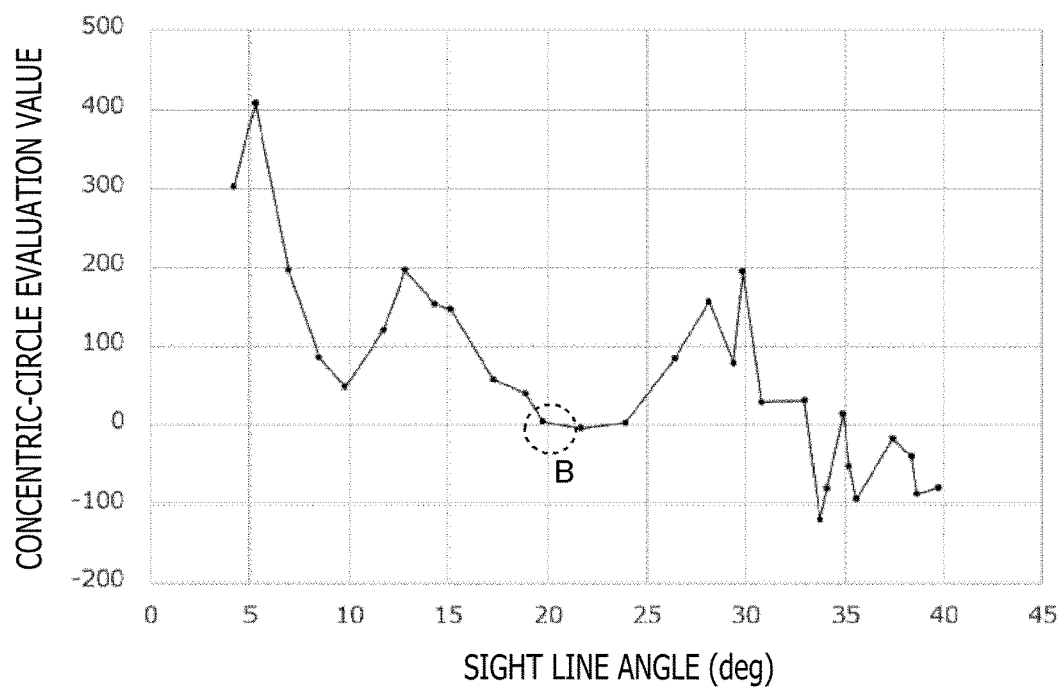
FIG. 19C is a graph depicting a concentric-circle evaluation value obtained by use of the lens system SB.

FIG. 19B is a graph depicting the relation between the distance from the optical axis LC and the groove pitch in the lens system SB. The groove depth was fixed independently from the distance from the lens center. The groove depth in the lens surface L1f of the first Fresnel lens FL1 was 0.15 mm, and the groove depth in the lens surface L2f of the second Fresnel lens FL2 was 0.12 mm. FIG. 19C is a graph depicting the relation between a concentric-circle evaluation value and a sight line angle obtained when the lens system SB was used. According to this graph, the concentric-circle evaluation value 1) was 0 or close to 0 in a range indicated by a broken line B in FIG. 19C. By ray tracing, a prism corresponding to the range B was identified as a prism at a position B1 presented in FIGS. 19B and 23. The groove pitch of this prism is depicted in the table presented in FIG. 23.

It is to be noted that the concentric-circle evaluation value η was 0 at some points even in the range where the sight line angle θ was larger than approximately 30 degrees, as depicted in FIG. 19C. These points were not selected because the groove pitch in another lens system (specifically, a lens system SE that will be described later) was lower.

Figure 20A:
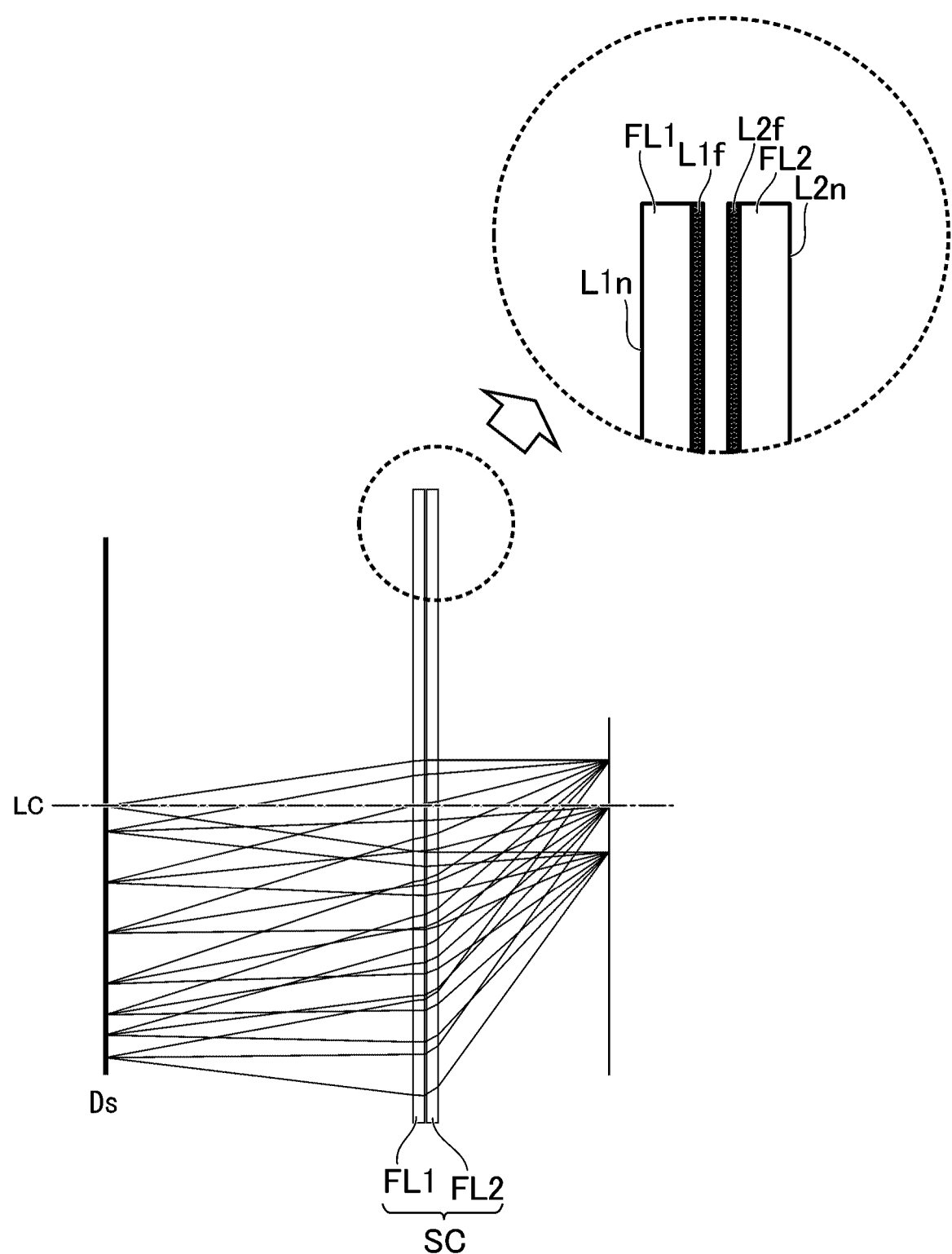
FIG. 20A is a diagram depicting a configuration of a lens system SC used to obtain the condition depicted in FIG. 7.

FIG. 20A is a diagram depicting a configuration of the lens system SC. The lens system SC includes the Fresnel lens FL1 and the Fresnel lens FL2. The first Fresnel lens FL1 has a nearly flat surface L1n on the display surface Ds side and has a lens surface L1f having a Fresnel structure and disposed opposite to the nearly flat surface L1n. The second Fresnel lens FL2 has a lens surface L2f having a Fresnel structure and being opposed to the lens surface L1f of the first Fresnel lens FL1 and has a nearly flat surface L2n disposed opposite to the lens surface L2f.

Figure 20B:
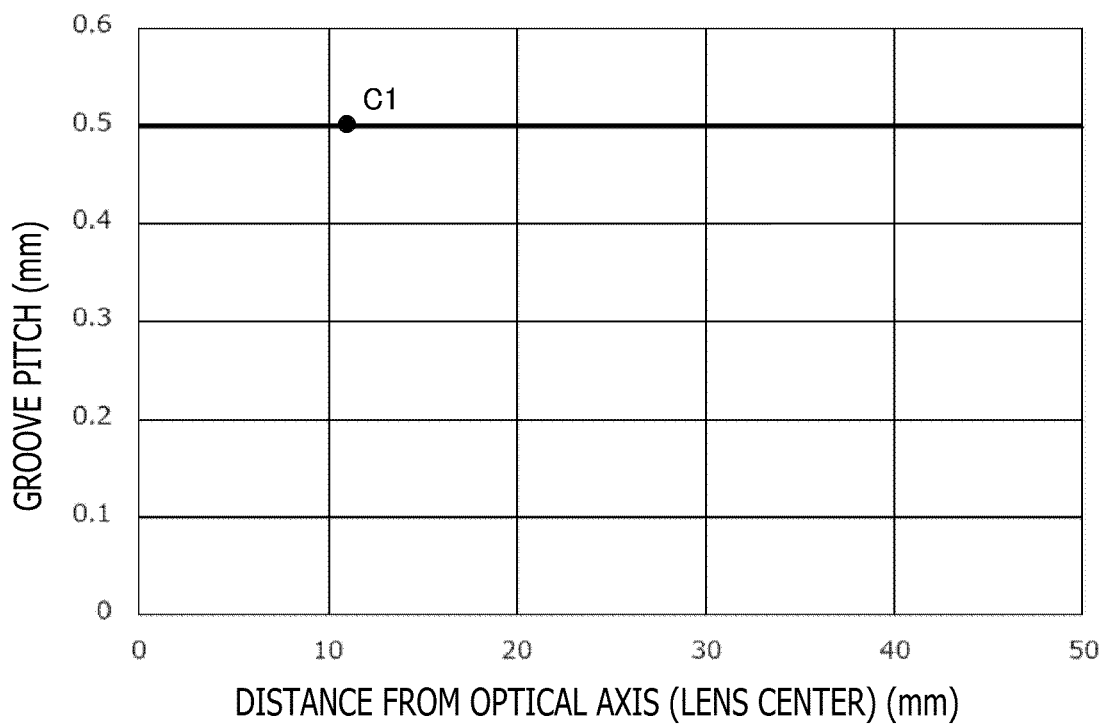
FIG. 20B is a graph depicting a groove pitch in the lens system SC.
Figure 20C:
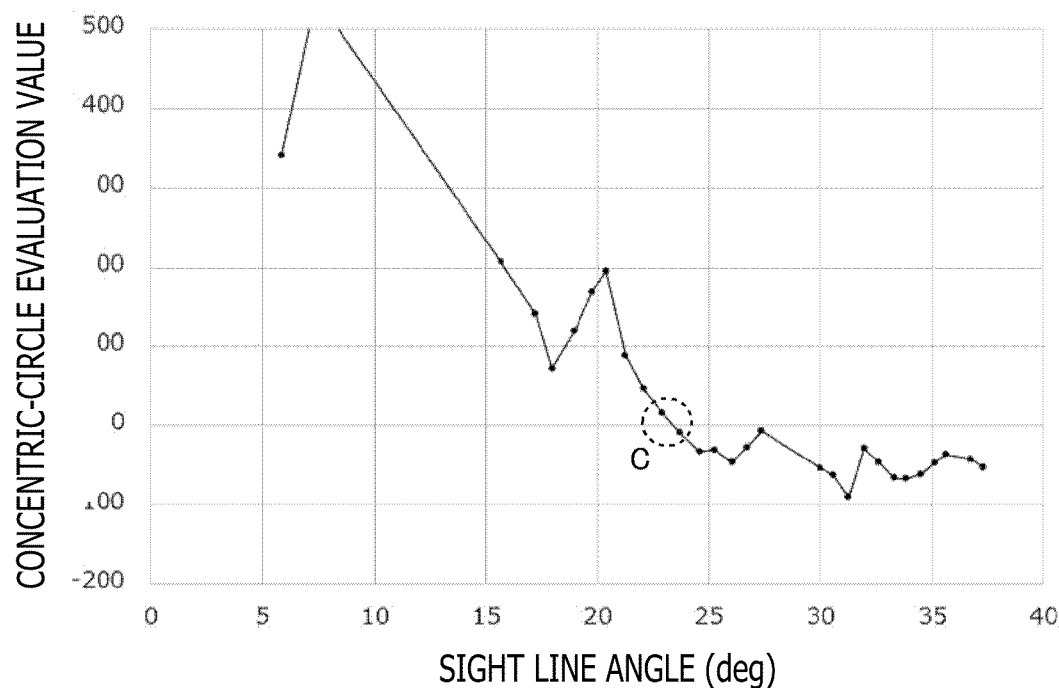
FIG. 20C is a graph depicting a concentric-circle evaluation value obtained by use of the lens system SC.

FIG. 20B is a graph depicting the relation between the distance from the optical axis LC and the groove pitch in each of the Fresnel lenses FL1 and FL2. In each of the two Fresnel lenses FL1 and FL2, the groove pitch was fixed to be 0.5 mm, independently from the distance from the optical axis LC, as depicted in FIG. 20B. The groove depth in the lens system SC was unclear because the lens system SC was purchased from the outside. FIG. 20C is a graph depicting the relation between a sight line angle and a concentric-circle evaluation value obtained when the lens system SC was used. According to this graph, the concentric-circle evaluation value η was 0 or close to 0 in a range indicated by a broken line C in FIG. 20C. By ray tracing, a prism corresponding to the range C was identified as a prism at a position C1 (at a distance of 10.5 mm from the lens center) presented in FIGS. 20B and 23. The groove pitch of this prism was 0.5 mm, as described previously.

Figure 21A:
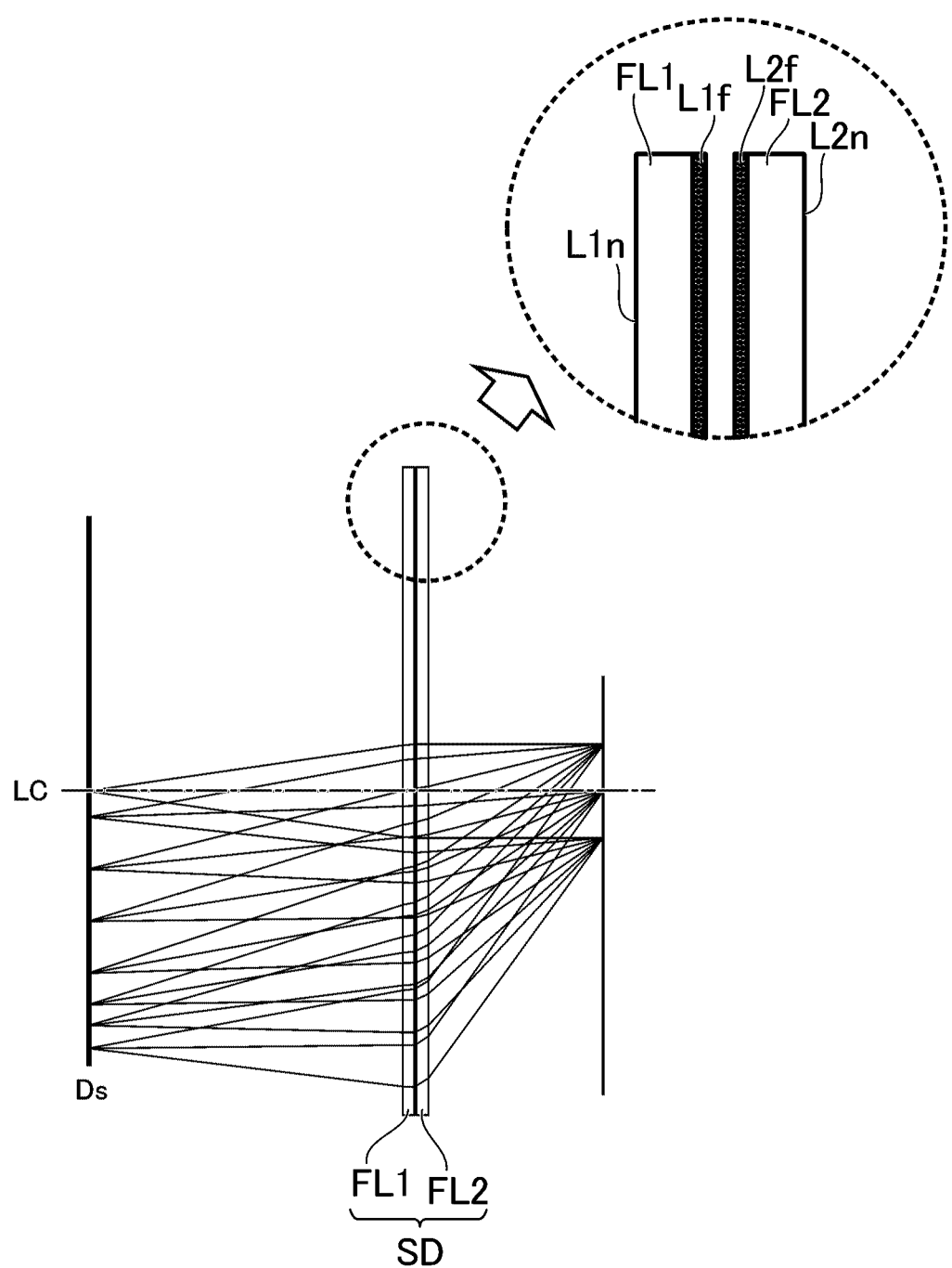
FIG. 21A is a diagram depicting a configuration of a lens system SD used to obtain the condition depicted in FIG. 7.

FIG. 21A is a diagram depicting a configuration of the lens system SD. The lens system SD includes the first Fresnel lens FL1 and the second Fresnel lens FL2. The two Fresnel lenses FL1 and FL2 have the same configuration as that of the Fresnel lenses FL1 and FL2 of the lens system SC. That is, the first Fresnel lens FL1 has a nearly flat surface Ln and a lens surface L1f having a Fresnel structure. The second Fresnel lens FL2 has a lens surface L2f having a Fresnel structure, and a nearly flat surface L2n.

Figure 21B:
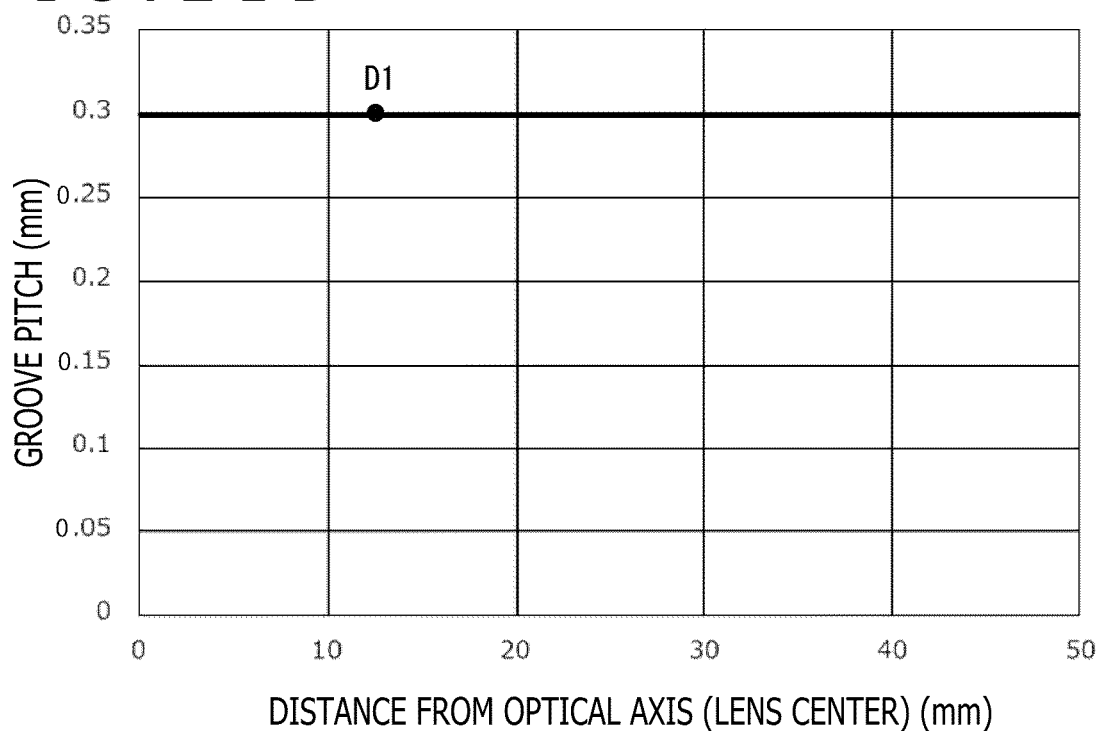
FIG. 21B is a graph depicting a groove pitch in the lens system SD.
Figure 21C:
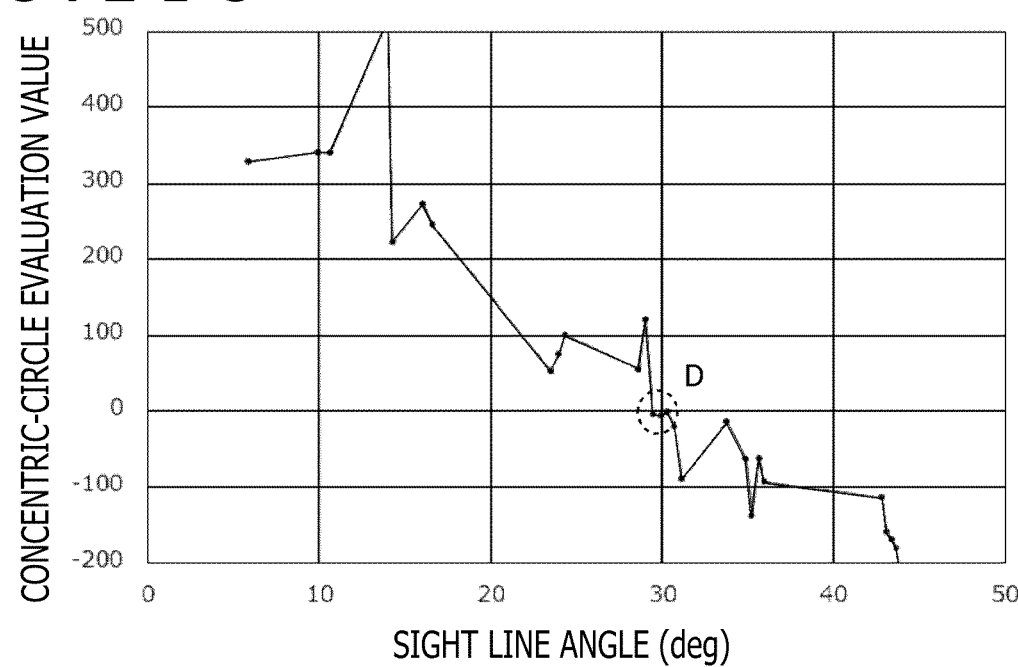
FIG. 21C is a graph depicting a concentric-circle evaluation value obtained by use of the lens system SD.

FIG. 21B is a graph depicting the relation between the distance from the optical axis LC and the groove pitch in each of the Fresnel lenses FL1 and FL2. As depicted in FIG. 21B, the groove pitch in each of the two Fresnel lenses FL1 and FL2 was fixed to be 0.3 mm, independently from the distance from the optical axis LC. The groove depth in the lens system SD was unclear because the lens system SD was purchased from the outside. FIG. 21C is a graph depicting the relation between a sight line angle and a concentric-circle evaluation value obtained when the lens system SD was used. According to this graph, the concentric-circle evaluation value η was 0 or close to 0 in a range indicated by a broken line D in FIG. 21C. By ray tracing, a prism corresponding to the range D was identified as a prism at a position D1 (at a distance of 12.6 mm from the lens center) presented in FIGS. 21B and 23. The groove pitch of this prism was 0.3 mm, as described previously.

Figure 22A:
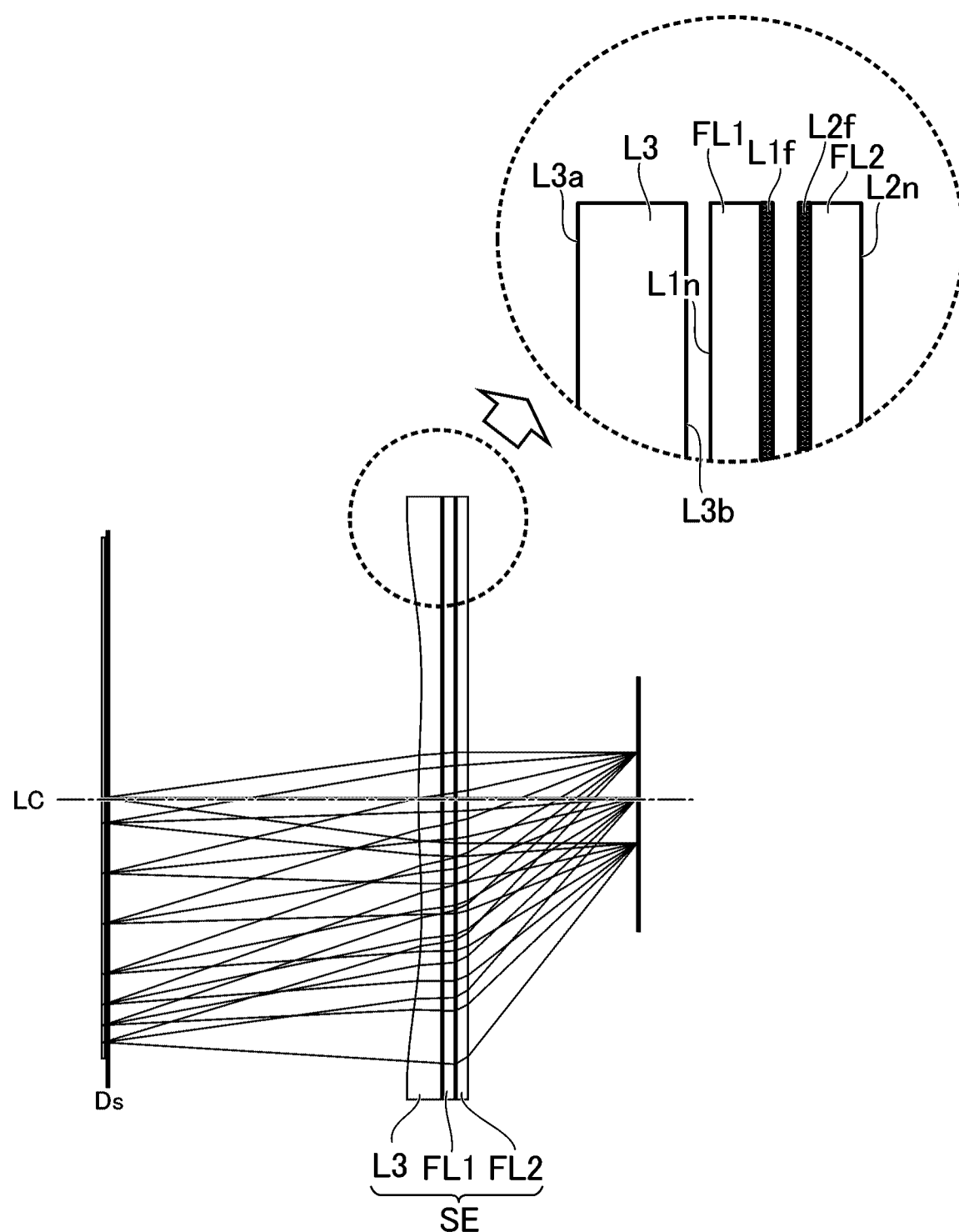
FIG. 22A is a diagram depicting a configuration of a lens system SE used to obtain the condition depicted in FIG. 7.

FIG. 22A is a diagram depicting a configuration of the lens system SE. Similarly to the lens system SB, the lens system SE includes an aspherical lens L3, a first Fresnel lens FL1, and a second Fresnel lens FL2. The aspherical lens L3 has a lens surface L3a having an aspherical shape and has a nearly flat surface L3b opposite to the lens surface L3a. The first Fresnel lens FL1 has a nearly flat surface L1n and a lens surface L1f that has a Fresnel structure. The second Fresnel lens FL2 has a lens surface L2f that has a Fresnel structure, and a nearly flat surface L2n.

Figure 22B:
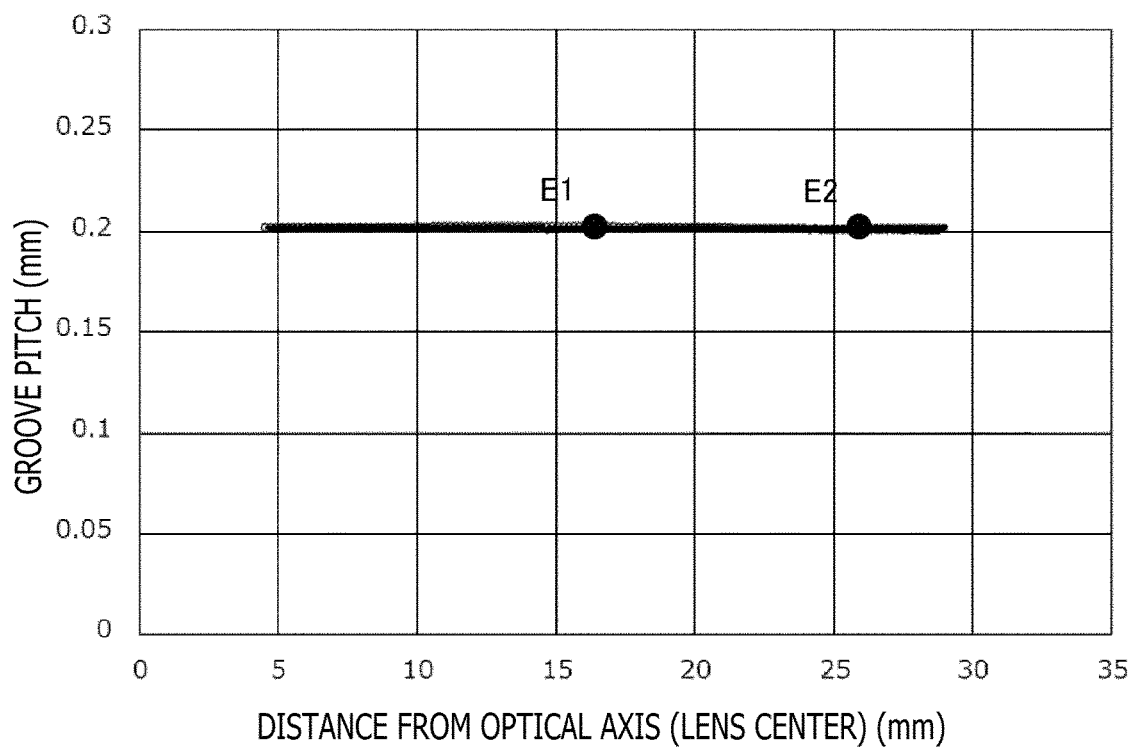
FIG. 22B is a graph depicting a groove pitch in the lens system SE.
Figure 22C:
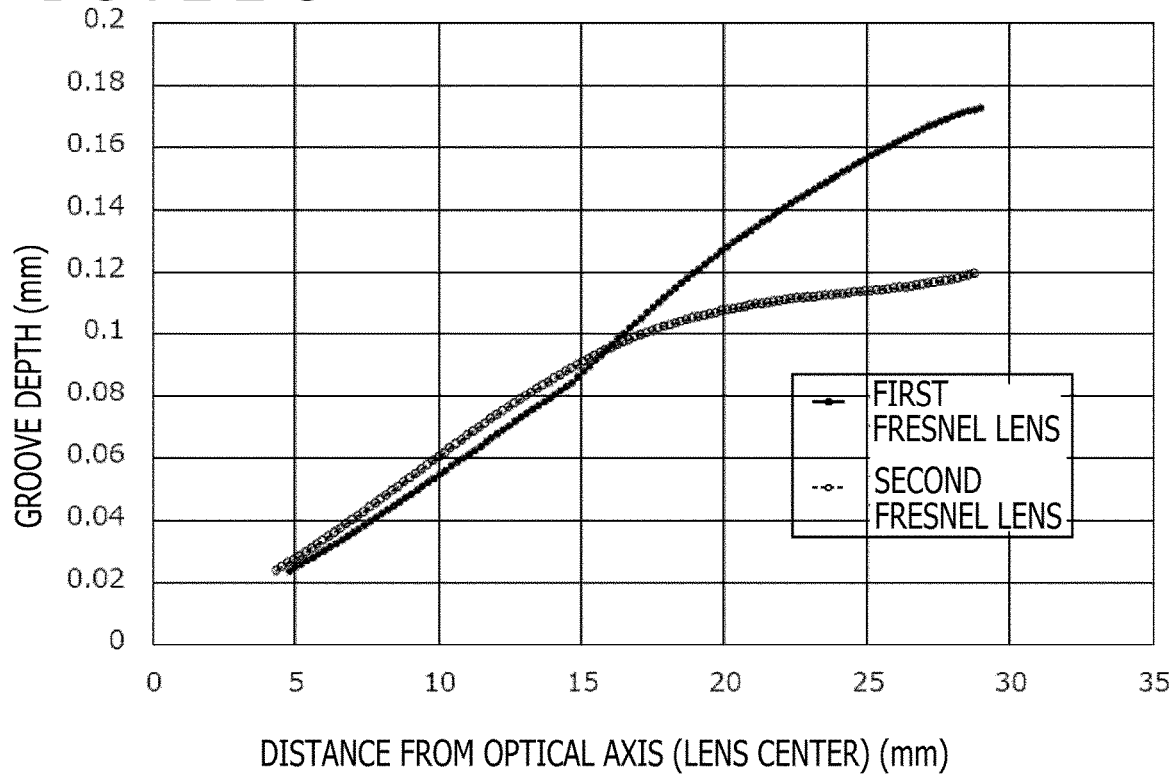
FIG. 22C is a graph depicting a groove depth in the lens system SE.
Figures 22D, 23:
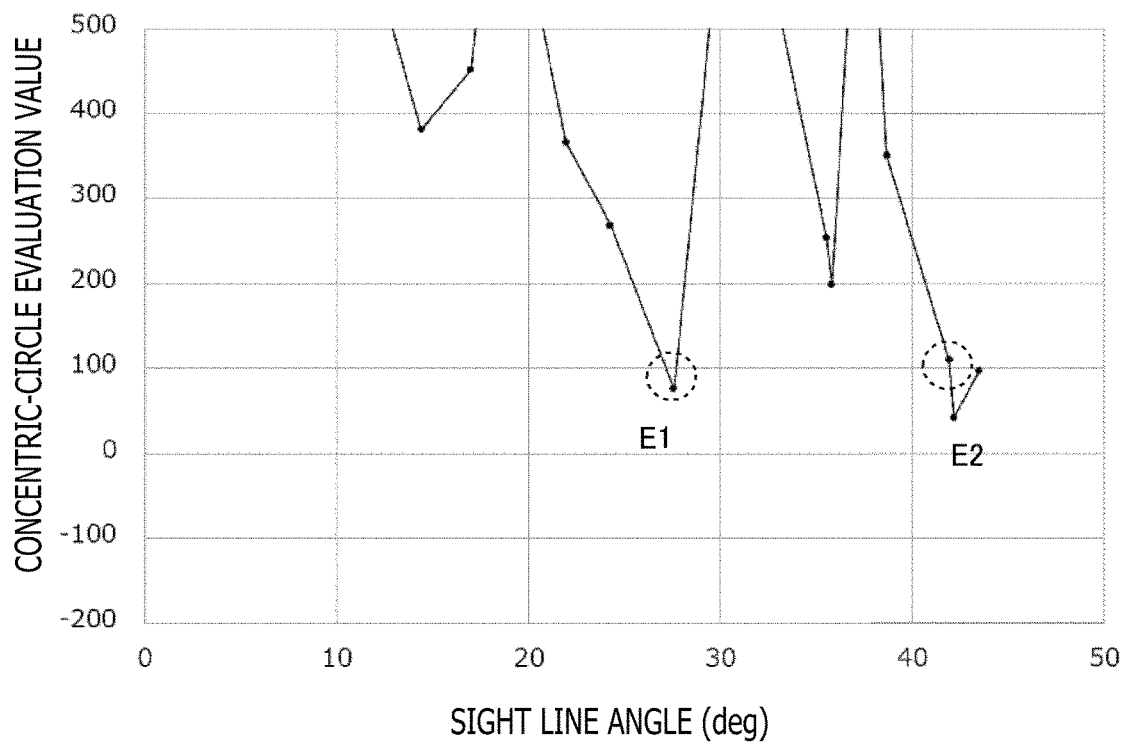
FIG. 22D is a graph depicting a concentric-circle evaluation value obtained by use of the lens system SE.
FIG. 23 is a table depicting a groove pitch selected to obtain the condition depicted in FIG. 7.

FIG. 22B is a graph depicting the relation between the distance from the optical axis LC and the groove pitch in the lens system SE. FIG. 22C is a graph depicting the relation between the distance from the optical axis LC and the groove depth. As depicted in FIG. 22B, in each of the two Fresnel lenses FL1 and FL2, the groove pitch was fixed to be 0.2 mm, independently of the distance from the optical axis LC. On the other hand, the groove depth increased with the distance from the optical axis LC, as depicted in FIG. 22C. FIG. 22D is a graph depicting the relation between a concentric-circle evaluation value and a sight line angle obtained when the lens system SD was used. According to this graph, the concentric-circle evaluation value η was close to 0 in each of a range E1 and a range E2. Prisms corresponding to the ranges E1 and E2 were identified as prisms at a point E1 (sight line angle of 27.6 degrees (distance from the lens center: 16.3 mm)) and a point E2 (sight line angle of 42.1 degrees (distance from the lens center: 26.1 mm)), as depicted in FIGS. 22B and 23. The groove pitch of these prisms was 0.2 mm, as described previously.

From the selected 10 points depicted in FIG. 23, the condition of a desired groove pitch depicted in FIG. 7 was obtained. That is, the formula (2) passing among 10 points was obtained. The formula (2) is a function representing a groove pitch at which the concentric-circle evaluation value becomes close to 0. Therefore, when the groove pitch is equal to or less than the value of "formula (2)×1.5," generation of concentric circles can be suppressed. Further, when the groove pitch is reduced, the resolution of an image obtained through the lens system is degraded. However, when the groove pitch is equal to or greater than the value of "formula (2)×0.5," an allowable result regarding the resolution can be obtained.

Example 1

An example of a lens system including only one Fresnel lens will be explained.

The configuration of a lens system according to the example, which is similar to that of the lens system S1 depicted in FIG. 3, includes one Fresnel lens L. The Fresnel lens L has a lens surface Lf directed to the display surface Ds side. The lens surface Lf has a Fresnel structure. The Fresnel lens L has a lens surface Ln opposite to the lens surface Lf. The lens surface Ln has an aspherical shape.

Figure 24A:
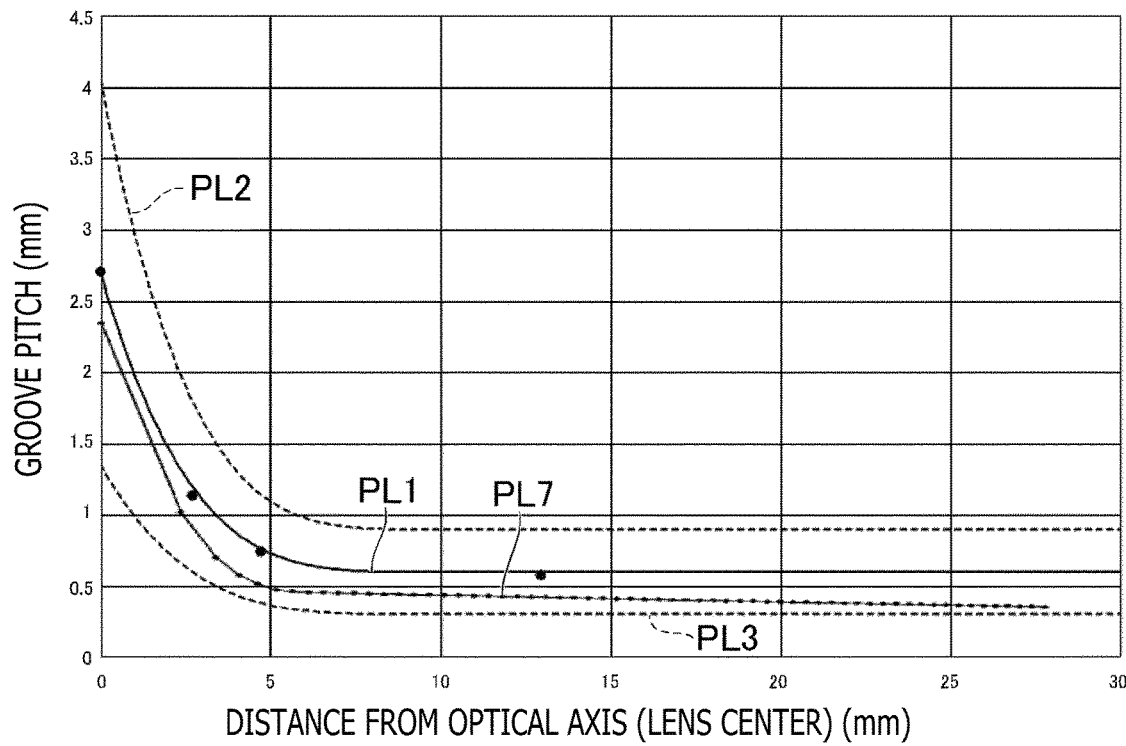
FIG. 24A is a graph for explaining a lens system according to a first example, and depicts a groove pitch.

FIG. 24A is a graph depicting the relation between a distance from the optical axis LC and a groove pitch in the lens system (Fresnel lens L) according to the example. In FIG. 24A, the relation between the distance from the optical axis LC and the groove pitch is indicated by a solid line PL7. Further, a solid line PL1 expressed by the above formula (1) and broken lines PL2 and PL3 for defining the conditions of the groove pitch are depicted. As depicted in FIG. 24A, the groove pitch in the Fresnel lens L satisfies the conditions specified by the broken lines PL2 and PL3.

Figure 24B:
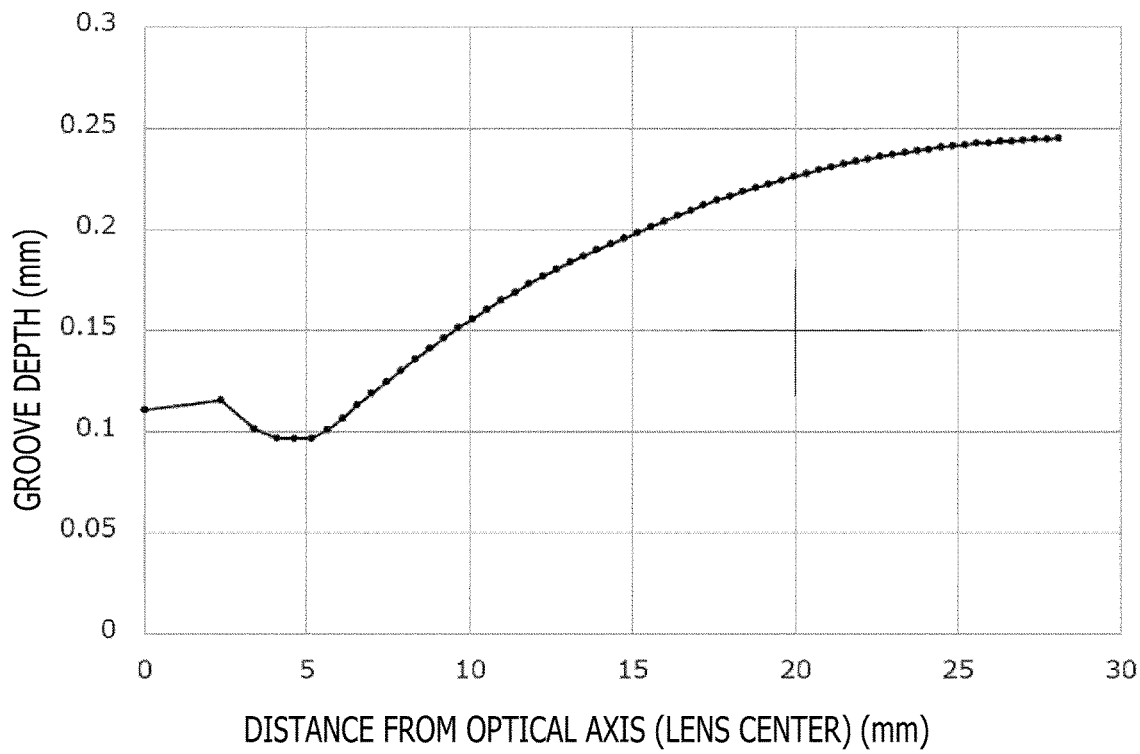
FIG. 24B is a graph for explaining the lens system according to the first example, and depicts a groove depth.

FIG. 24B is a graph depicting the relation between the distance from the optical axis LC and the groove depth. As depicted in FIGS. 24A and 24B, both the groove pitch and the groove depth in the Fresnel lens L according to the example gradually vary with the distance from the optical axis LC.

Specifically, over the whole range, the groove pitch gradually decreases with the distance from the optical axis LC. In the range where the distance from the optical axis LC is 0 to 5 mm, the pitch sharply decreases. In the range where the distance from the optical axis LC is 5 mm or more, the pitch gently decreases. On the other hand, the groove depth becomes minimum in a position at a distance of approximately 5 mm from the optical axis LC, and the groove depth gradually increases in the range where the distance from the optical axis LC is approximately 5 mm or more.

Figure 24C:
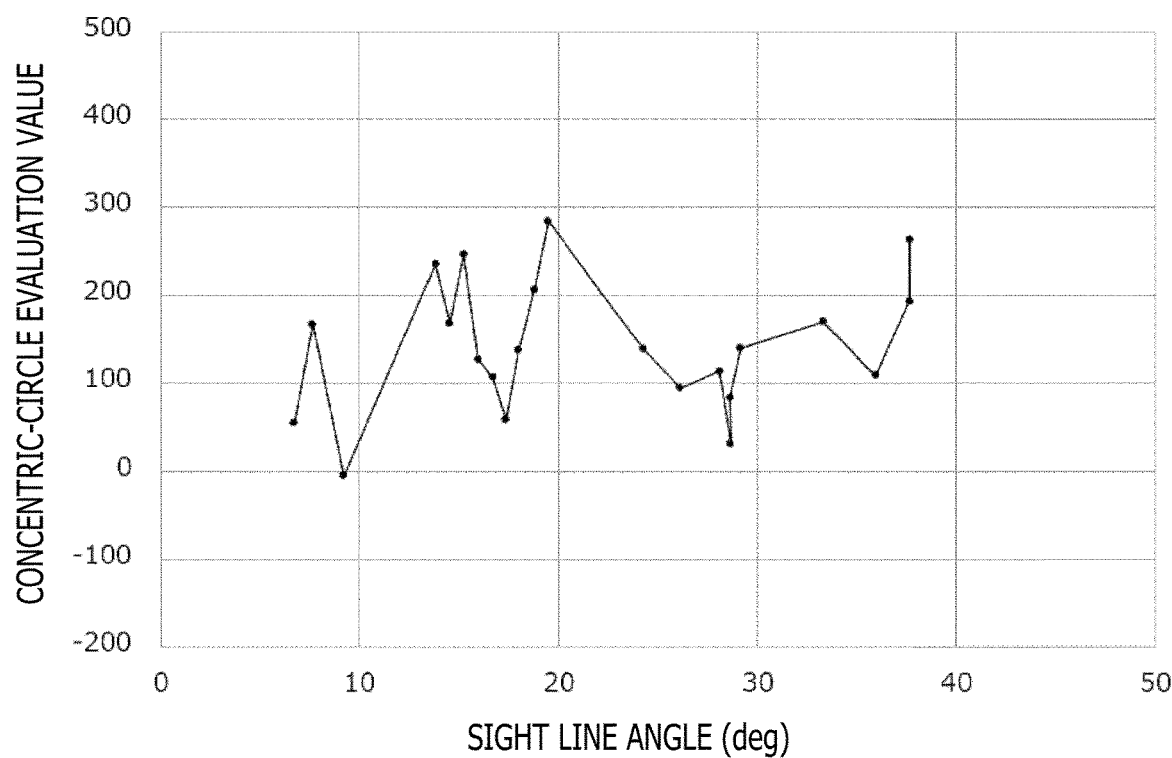
FIG. 24C is a graph for explaining the lens system according to the first example, and depicts a concentric-circle evaluation value.
Figure 24D:
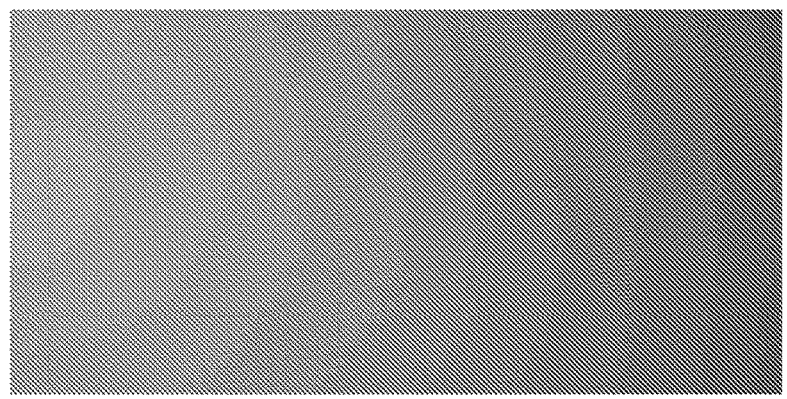
FIG. 24D is a photographed image obtained by use of the lens system according to the first example.

By a method similar to those for the lens systems SG to SI, a concentric-circle evaluation value was obtained for the lens system (Fresnel lens L) according to the example. FIG. 24C is a graph depicting the relation between the sight line angle and the concentric-circle evaluation value obtained when the Fresnel lens L was used. As depicted in this graph, no concentric-circle evaluation value that was much less than 0 was generated in any of the ranges. This means that the lens system according to the example did not generate any concentric circle. FIG. 24D is an image obtained by being photographed with use of the lens system according to the example under the photographing condition depicted in FIG. 8. As depicted in FIG. 24D, generation of a concentric circle was not acknowledged in any point in the photographed image.

Example 2

An example of a lens system including two Fresnel lenses will be explained.

The configuration of the lens system according to the example is similar to that of the lens system depicted in FIG. 6 and includes two Fresnel lenses FL1 and FL2. The first Fresnel lens FL1 has a lens surface L1n directed to the display surface Ds side. The lens surface L1n forms an aspherical lens. The first Fresnel lens FL1 has a lens surface L1f having a Fresnel structure opposite to the lens surface L1n. The second Fresnel lens FL2 has a lens surface L2f having a Fresnel structure and being directed toward the first Fresnel lens FL1. Therefore, the lens surface L1f of the first Fresnel lens FL1 is opposed to the lens surface L2f of the second Fresnel lens FL2. The second Fresnel lens FL2 has a nearly flat surface L2n opposite to the lens surface L2f.

Figure 25A:
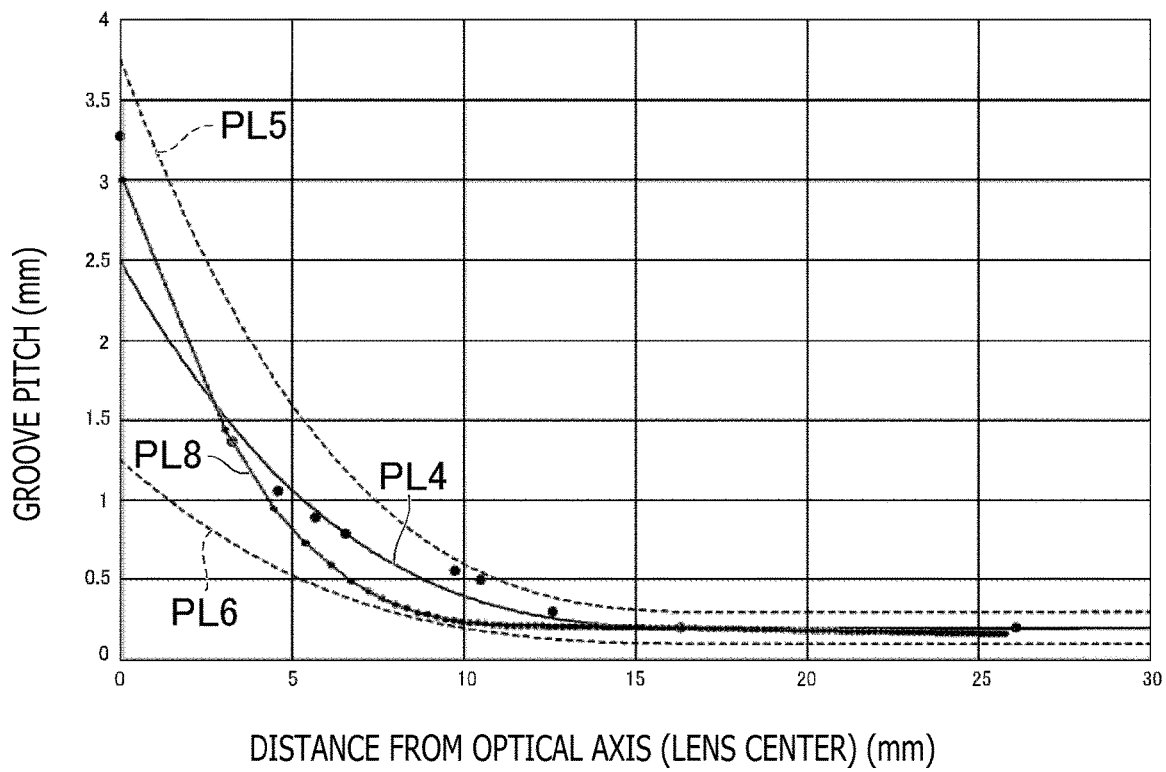
FIG. 25A is a graph for explaining a lens system according to a second example, and depicts a groove pitch.

FIG. 25A is a graph depicting the relation between a distance from the optical axis LC and a groove pitch in each of the Fresnel lenses FL1 and FL2 of the lens system according to the example. The groove pitch is common to the two Fresnel lenses FL1 and FL2. In FIG. 25A, the relation between the distance from the optical axis LC and the groove pitch is indicated by a solid line PL8. Further, a solid line PL4 expressed by the above formula (2) and broken lines PL5 and PL6 for defining the conditions of the groove pitch are depicted. As depicted in FIG. 25A, the groove pitch in each of the Fresnel lenses FL1 and FL2 satisfies the conditions specified by broken lines PL2 and PL3.

Figure 25B:
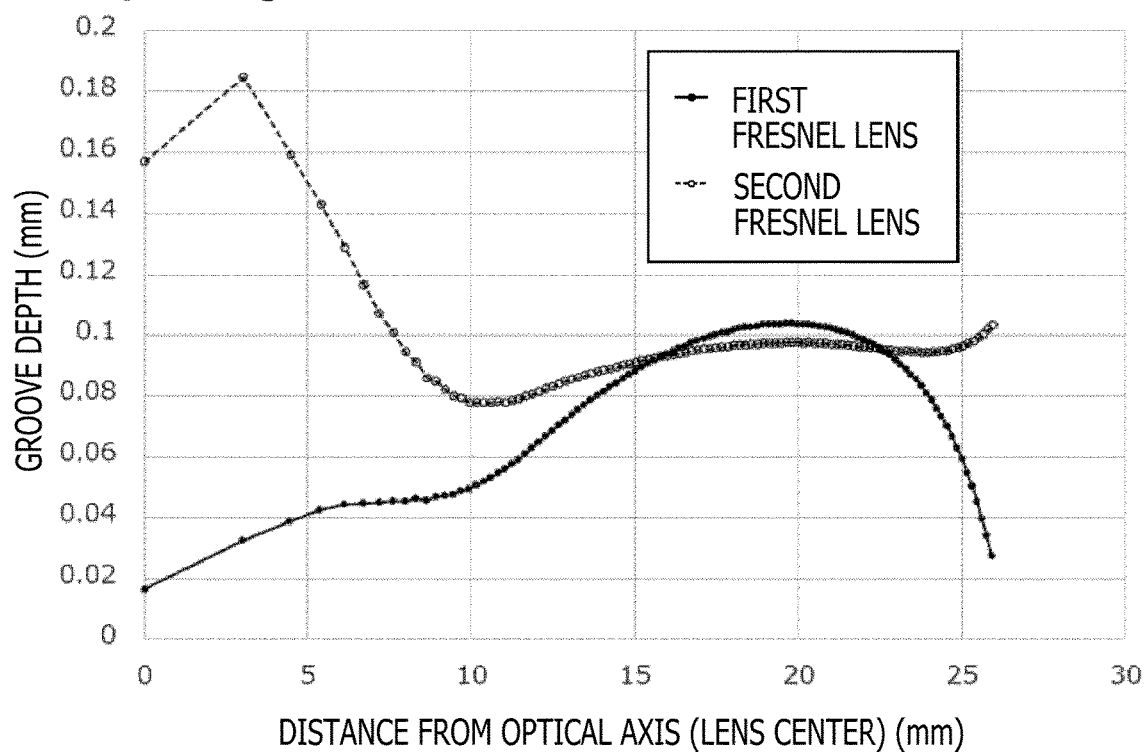
FIG. 25B is a graph for explaining the lens system according to the second example, and depicts a groove depth.

FIG. 25B is a graph depicting the relation between the distance from the optical axis LC and the groove depth in the Fresnel lenses FL1 and L2. As depicted in FIGS. 25A and 25B, both the groove pitch and the groove depth in each of the Fresnel lenses FL1 and FL2 according to the example gradually vary with the distance from the optical axis LC.

Specifically, over the whole range, the groove pitch gradually decreases with the distance from the optical axis LC. In the range where the distance from the optical axis LC is 0 to approximately 8 mm, the pitch sharply decreases. In the range where the distance from the optical axis LC is 8 mm or more, the pitch gently decreases. On the other hand, the groove depth in the first Fresnel lens FL1 gradually increases in the range where the distance from the optical axis LC is approximately 20 mm or less, and gradually decreases in the range where the distance is approximately 20 mm or more, as depicted in FIG. 25B. The groove depth in the second Fresnel lens FL2 gradually decreases in the range of approximately 3 mm to 10 mm, and gently and gradually increases in the range of 10 mm or more.

Figure 25C:
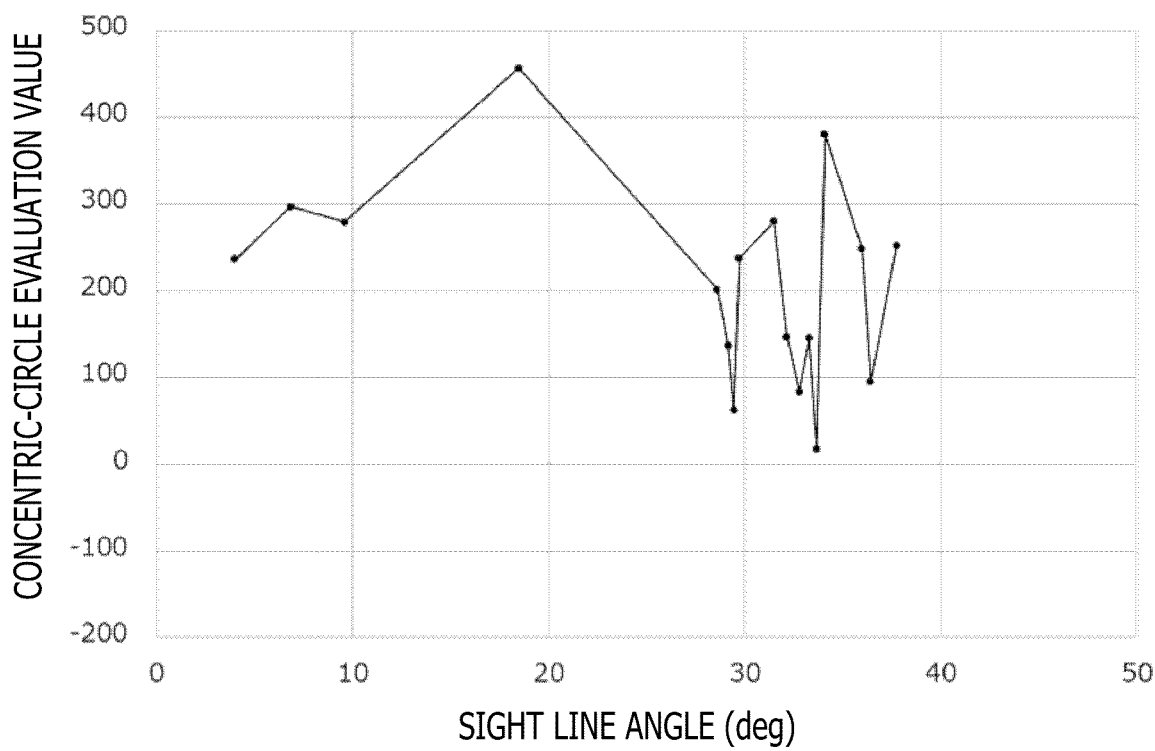
FIG. 25C is a graph for explaining the lens system according to the second example, and depicts a concentric-circle evaluation value.
Figure 25D:
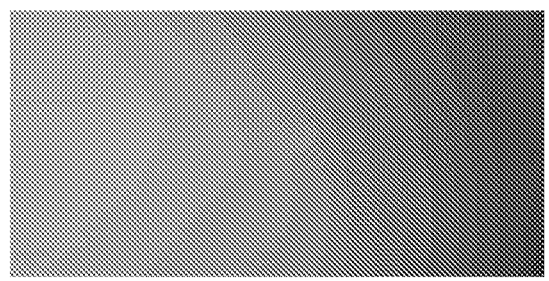
FIG. 25D is a photographed image obtained by use of the lens system according to the second example.

By a method similar to those for the lens systems SA to SE, a concentric-circle evaluation value was obtained for the lens system (Fresnel lenses FL1 and FL2) according to the example. FIG. 25C is a graph depicting the relation between a sight line angle and a concentric-circle evaluation value obtained when the lens system according to the example was used. As depicted in this graph, no concentric-circle evaluation value that was much less than 0 was generated in any of the ranges. This means that the lens system according to the example did not generate any concentric circle. FIG. 25D is an image obtained by being photographed with use of the lens system according to the example under the photographing condition depicted in FIG. 8. As depicted in FIG. 25D, generation of a concentric circle was not acknowledged in any point in the photographed image.

The invention claimed is:

1. A lens system, comprising:
a Fresnel lens, wherein:
  a lens surface of the Fresnel lens has a plurality of grooves that is concentrically formed,
  both a pitch that is a distance between two adjacent grooves and a depth of each of the plurality of grooves vary with a distance from an optical axis that passes through a center of the lens system,
  the pitch in a position at a distance of 0 mm from the optical axis is 1.35 to 2.97 mm,
  the pitch in a position at a distance of 5 mm from the optical axis is 0.37 to 0.80 mm, and
  the pitch in a position at a distance of 10 mm from the optical axis is 0.30 to 0.66 mm.

2. The lens system according to claim 1, wherein:
a range where the depth gradually increases with the distance from the optical axis is provided, and
in at least a part of the range, the pitch gradually decreases with the distance from the optical axis.

3. The lens system according to claim 1, wherein:
in a case where a distance from a center of the Fresnel lens and the pitch are defined as X (mm) and P (mm), respectively, when 0 mm≤X≤10 mm, X and P satisfy following conditions:

$P \leq (0.00021(X-10)^4 + 0.6) \times 1.5$ $P \geq (0.00021(X-10)^4 + 0.6) \times 0.5.$ 4. The lens system according to claim 3, wherein when 10 mm<X, P satisfies a condition 0.3≤P≤0.9.

5. The lens system according to claim 1, wherein the Fresnel lens is included in a head mounted display.

6. A lens system, comprising:
a first Fresnel lens comprising an optical axis; and
a second Fresnel lens disposed in an optical axis direction of the optical axis, wherein:
  a lens surface of each of the first Fresnel lens and the second Fresnel lens has a plurality of grooves that is concentrically formed,
  both a pitch that is a distance between two adjacent grooves and a depth of each of the plurality of grooves vary with a distance from an optical axis that passes through a center of the lens system, and
  in each of the first Fresnel lens and the second Fresnel lens,
    the pitch in a position at a distance of 0 mm from the optical axis is 1.24 to 2.97 mm,
    the pitch in a position at a distance of 5 mm from the optical axis is 0.53 to 1.27 mm, and
    the pitch in a range where the distance from the optical axis is 18 mm or more is 0.10 to 0.24 mm.

7. The lens system according to claim 6, wherein:
a range where the depth gradually increases with the distance from the optical axis is provided, and
in at least a part of the range, the pitch gradually decreases with the distance from the optical axis.

8. The lens system according to claim 6, wherein in a case where, in each of the first Fresnel lens and the second Fresnel lens, a distance from the optical axis and a pitch are defined as X (mm) and P (mm), respectively, when 0 mm≤X≤18 mm, X and P satisfy following conditions:

$P \leq (-0.00039(X-18)^3 + 0.2) \times 1.5$ $P \geq (-0.00039(X-18)^3 + 0.2) \times 0.5.$ 9. The lens system according to claim 8, wherein: when 18 mm<X, X and P have a relation 0.10≤P≤0.30.

10. The lens system according to claim 6, wherein the first Fresnel lens and the second Fresnel lens are included in a head mounted display.

11. An image observation apparatus, comprising:
a Fresnel lens, wherein:
a lens surface of the Fresnel lens has a plurality of grooves that is concentrically formed,
both a pitch that is a distance between two adjacent grooves and a depth of each of the plurality of grooves vary with a distance from an optical axis that passes through a center of a lens system,
the pitch in a position at a distance of 0 mm from the optical axis is 1.35 to 2.97 mm,
the pitch in a position at a distance of 5 mm from the optical axis is 0.37 to 0.80 mm, and
the pitch in a position at a distance of 10 mm from the optical axis is 0.30 to 0.66 mm.

12. The image observation apparatus according to claim 11, wherein:
a range where the depth gradually increases with the distance from the optical axis is provided, and
in at least a part of the range, the pitch gradually decreases with the distance from the optical axis.

13. The image observation apparatus according to claim 11, wherein:
in a case where a distance from a center of the Fresnel lens and the pitch are defined as X (mm) and P (mm), respectively, when 0 mm≤X≤10 mm, X and P satisfy following conditions:

$P \le (0.00021(X-10)^4+0.6) \times 1.5$ $P \ge (0.00021(X-10)^4+0.6) \times 0.5.$ 14. The image observation apparatus according to claim 13, wherein when 10 mm<X, P satisfies a condition 0.3≤P≤0.9.

15. The image observation apparatus according to claim 11, wherein the Fresnel lens is included in a head mounted display.

16. An image observation apparatus, comprising:
a first Fresnel lens comprising an optical axis; and
a second Fresnel lens disposed in an optical axis direction of the optical axis, wherein:
a lens surface of each of the first Fresnel lens and the second Fresnel lens has a plurality of grooves that is concentrically formed,
both a pitch that is a distance between two adjacent grooves and a depth of each of the plurality of grooves vary with a distance from an optical axis that passes through a center of a lens system, and
in each of the first Fresnel lens and the second Fresnel lens,
the pitch in a position at a distance of 0 mm from the optical axis is 1.24 to 2.97 mm,
the pitch in a position at a distance of 5 mm from the optical axis is 0.53 to 1.27 mm, and
the pitch in a range where the distance from the optical axis is 18 mm or more is 0.10 to 0.24 mm.

17. The image observation apparatus according to claim 16, wherein:
a range where the depth gradually increases with the distance from the optical axis is provided, and
in at least a part of the range, the pitch gradually decreases with the distance from the optical axis.

18. The image observation apparatus according to claim 16, wherein in a case where, in each of the first Fresnel lens and the second Fresnel lens, a distance from the optical axis and a pitch are defined as X (mm) and P (mm), respectively, when 0 mm≤X≤18 mm, X and P satisfy following conditions:

$P \le (-0.00039(X-18)^3+0.2) \times 1.5$ $P \ge (-0.00039(X-18)^3+0.2) \times 0.5.$ 19. The image observation apparatus according to claim 18, wherein: when 18 mm<X, X and P have a relation 0.10≤P≤0.30.

20. The image observation apparatus according to claim 16, wherein the first Fresnel lens and the second Fresnel lens are included in a head mounted display.

\* \* \* \* \*